United States Patent
Liu et al.

(10) Patent No.: US 12,002,451 B1
(45) Date of Patent: Jun. 4, 2024

(54) AUTOMATIC SPEECH RECOGNITION

(71) Applicant: Amazon Technologies, Inc., Seattle, WA (US)

(72) Inventors: Jing Liu, Pittsburgh, PA (US); Feng-Ju Chang, Pittsburgh, PA (US); Athanasios Mouchtaris, Pittsburgh, PA (US); Martin Radfar, North York (CA); Maurizio Omologo, Altopiano della Vigolana (IT); Siegfried Kunzmann, Heidelberg (DE)

(73) Assignee: Amazon Technologies, Inc., Seattle, WA (US)

( * ) Notice: Subject to any disclaimer, the term of this patent is extended or adjusted under 35 U.S.C. 154(b) by 438 days.

(21) Appl. No.: 17/484,457

(22) Filed: Sep. 24, 2021

Related U.S. Application Data

(60) Provisional application No. 63/217,592, filed on Jul. 1, 2021.

(51) Int. Cl.
*G10L 15/08* (2006.01)
*G10L 15/00* (2013.01)
*G10L 15/02* (2006.01)

(52) U.S. Cl.
CPC ............ *G10L 15/08* (2013.01); *G10L 15/005* (2013.01); *G10L 15/02* (2013.01); *G10L 2015/088* (2013.01)

(58) Field of Classification Search
CPC ....... G10L 15/08; G10L 15/005; G10L 15/02; G10L 2015/088
USPC .......................................................... 704/254
See application file for complete search history.

(56) References Cited

U.S. PATENT DOCUMENTS

| | | | | |
|---|---|---|---|---|
| 5,970,446 A * | 10/1999 | Goldberg | ................ | G10L 15/20 704/235 |
| 6,324,512 B1 * | 11/2001 | Junqua | ............. | H04N 21/42203 704/256.1 |
| 6,353,794 B1 * | 3/2002 | Davis | ..................... | G01C 23/00 342/36 |
| 7,006,973 B1 * | 2/2006 | Genly | ..................... | G10L 15/22 704/E15.04 |
| 8,600,743 B2 * | 12/2013 | Lindahl | .................. | G10L 15/20 704/235 |
| 9,754,591 B1 * | 9/2017 | Kumar | .................... | G10L 15/22 |

(Continued)

OTHER PUBLICATIONS

Alex Graves, et al., "Connectionist temporal classification: labelling unsegmented sequence data with recurrent neural networks," in Proceedings of the 23rd International Conference on Machine Learning, 2006, 8 pages.

(Continued)

*Primary Examiner* — Thuykhanh Le
(74) *Attorney, Agent, or Firm* — Pierce Atwood LLP

(57) ABSTRACT

Techniques for performing automatic speech recognition (ASR) are described. In some embodiments, an ASR component integrates contextual information from user profile data into audio encoding data to predict a token(s) corresponding to a spoken input. The user profile data may include personalized words, such as, contact names, device names, etc. The ASR component determines word embedding data using the personalized words. The ASR component is configured to apply attention to audio frames that are relevant to the personalized words based on processing the audio encoding data and the word embedding data.

20 Claims, 15 Drawing Sheets

(56) References Cited

U.S. PATENT DOCUMENTS

| | | | | |
|---|---|---|---|---|
| 11,004,454 | B1* | 5/2021 | Srinivasan | G10L 17/04 |
| 11,056,097 | B2* | 7/2021 | Short | G10L 25/21 |
| 2003/0167167 | A1* | 9/2003 | Gong | G10L 15/22 704/250 |
| 2004/0176958 | A1* | 9/2004 | Salmenkaita | H04M 3/4938 704/275 |
| 2005/0049860 | A1* | 3/2005 | Junqua | H04M 1/271 704/E15.04 |
| 2005/0108012 | A1* | 5/2005 | Roth | G10L 15/08 704/252 |
| 2005/0132301 | A1* | 6/2005 | Ikeda | G06F 3/04842 715/811 |
| 2005/0187758 | A1* | 8/2005 | Khasin | G10L 15/005 704/10 |
| 2005/0187767 | A1* | 8/2005 | Godden | G10L 15/08 704/238 |
| 2005/0187768 | A1* | 8/2005 | Godden | G10L 15/08 704/238 |
| 2006/0173684 | A1* | 8/2006 | Fischer | G10L 15/20 704/E15.044 |
| 2006/0271364 | A1* | 11/2006 | Mirkovic | G10L 15/22 704/E15.044 |
| 2007/0208579 | A1* | 9/2007 | Peterson | G06Q 30/016 379/71 |
| 2007/0282595 | A1* | 12/2007 | Tunning | G06F 16/3329 704/9 |
| 2008/0015864 | A1* | 1/2008 | Ross | G10L 15/1822 704/E15.044 |
| 2008/0162137 | A1* | 7/2008 | Saitoh | G10L 15/22 704/E15.04 |
| 2008/0247519 | A1* | 10/2008 | Abella | H04M 3/4936 704/E15.04 |
| 2009/0076798 | A1* | 3/2009 | Oh | G10L 15/1815 704/9 |
| 2009/0228273 | A1* | 9/2009 | Wang | G10L 15/22 704/235 |
| 2010/0138215 | A1* | 6/2010 | Williams | G10L 15/22 704/9 |
| 2010/0223056 | A1* | 9/2010 | Kadirkamanathan | G10L 13/08 704/E15.005 |
| 2011/0184730 | A1* | 7/2011 | LeBeau | G10L 15/30 704/235 |
| 2012/0022872 | A1* | 1/2012 | Gruber | G06F 40/35 704/270.1 |
| 2012/0035924 | A1* | 2/2012 | Jitkoff | G01C 21/3608 704/235 |
| 2012/0265528 | A1* | 10/2012 | Gruber | G10L 15/183 704/235 |
| 2014/0297284 | A1* | 10/2014 | Gruber | G10L 15/183 704/257 |
| 2017/0050191 | A1* | 2/2017 | Kramer | B04C 5/081 |
| 2017/0229124 | A1* | 8/2017 | Strohman | G10L 15/183 |
| 2018/0342258 | A1* | 11/2018 | Huffman | G10L 15/02 |
| 2019/0096396 | A1* | 3/2019 | Jiang | G10L 15/02 |
| 2021/0027766 | A1* | 1/2021 | Shi | G10L 15/063 |
| 2021/0074295 | A1* | 3/2021 | Moreno | G10L 15/005 |
| 2021/0090572 | A1* | 3/2021 | Mahmood | G06F 3/167 |
| 2021/0158801 | A1* | 5/2021 | Park | G10L 25/51 |
| 2021/0271826 | A1* | 9/2021 | Wang | G10L 15/005 |
| 2021/0343277 | A1* | 11/2021 | Jaber | G10L 15/08 |
| 2022/0137917 | A1* | 5/2022 | Tiwari | G10L 21/003 704/260 |
| 2022/0264180 | A1* | 8/2022 | Brannon | H04N 21/845 |
| 2022/0270597 | A1* | 8/2022 | Qiu | G10L 15/22 |
| 2022/0310080 | A1* | 9/2022 | Qiu | G10L 15/063 |
| 2022/0335953 | A1* | 10/2022 | Rikhye | G10L 15/22 |
| 2023/0401031 | A1* | 12/2023 | Knapp | G10L 15/08 |

OTHER PUBLICATIONS

William Chan, et al., "Listen, attend and spell: A neural for large vocabularly conversational speech recognition," ICASSP, 2016, arXiv preprint arXiv:1508.01211 (dated Aug. 20, 2015), 16 pages.

Alex Graves, "Sequence transduction with recurrent neural networks," first published in the International Conference of Machine Learning (ICML) 2012 Workshop on Representation Learning, arXiv preprint arXiv:1211.3711, 2012, 9 pages.

Linhao Dong, et al., "Speech-transformer: A no-recurrence sequence-to-sequence model for speech recognition," ICASSP, 2018, retrieved from IEEE Xplore on Aug. 24, 2021, 5 pages.

Chung-Cheng Chiu, et al., "State-of-the-art speech recognition with sequence-to-sequence models," ICASSP, 2018, arXiv preprint arXiv 1712.01769, 2018, 5 pages.

Rico Sennrich, et al., "Neural machine translation of rare words with subword units, in Proceedings of the 54th Annual Meeting of the Association for Computational Linguistics," 2016, pp. 1715-1725.

Taku Kudo, "Subword regularization: Improving neural network translation models with multiple subword candidates," arXiv preprint arXiv:1804.10959, 2018, 10 pages.

Y. He, et al., "Streaming end-to-end speech recognition for mobile devices," ICASSP, 2019, arXiv preprint arXiv:1811.06621 (dated Nov. 15, 2018), 5 pages.

Golan Pundak, et al., "Deep context: end-to-end contextual speech recognition," SLT, 2018, arXiv preprint arXiv:1808.02480, 2018, 8 pages.

Zhehuai Chen, et al., "Joint grapheme and phoneme embeddings for contextual end-to-end asr.," Interspeech, 2019, 5 pages.

Antoine Bruguier, et al., Phoebe: Pronunciation-aware contextualization for end-to-end speech recognition, ICASSP, 2019, pp. 6171-6175.

Mehryar Mohri, et al., "Weighted finite-state transducers in speech recognition," Computer Speech Language, vol. 16, Issue 1, Jan. 2002, pp. 69-88, retrieved from https://cs.nyu.edu/~mohri/postscript/csl01.pdf.

Ian Williams, et al., "Contextual speech recognition in end-to-end neural network systems using beam search," Interspeech, 2018, pp. 2227-2231.

Linda Liu, et al., "Domain-aware neural language mod-els for speech recognition," ICASSP, 2021, arXiv preprint arXiv:2101.03229, 2021, 5 pages.

Mahaveer Jain et al., "Contextual rnn-t for open domain asr," Interspeech 2020, arXiv preprint arXiv:2006.03411, 2020, 5 pages.

Da-Rong Liu, et al., "Contextualizing asr lattice rescoring with hybrid pointer network language model," Interspeech, 2020, pp. 3650-3654.

Aditya Gourav, et al., "Personalization strategies for end-to-end speech recognition systems," ICASSP, 2021, arXiv preprint ArXiv:2102.07739, 2021, 5 pages.

Ding Zhao, et al., "Shallow-Fusion End-to-End Contextual Biasing," Interspeech, 2019, pp. 1418-1422.

Petar Aleksic, et al., "Bringing contextual information to google speech recognition," Interspeech, 2015, pp. 468-472.

Caglar Gulcehre, et al., "On using mono-lingual corpora in neural machine translation," arXiv preprint arXiv:1503.03535, 2015, 9 pages.

Rongqing Huang, et al., "Class lm and word mapping for contextual biasing in end-to-end asr," arXiv preprint arXiv:2007.05609, 2020, 5 pages.

Zhehuai Chen, "End-to-end contextual speech recognition using class language mod-els and a token passing decoder," ICASSP, 2019, arXiv preprint arXiv:1812.02142 (dated Dec. 5, 2018), 5 pages.

Shubham Toshniwal, et al., "A comparison of techniques for language model integration in encoder-decoder speech recognition," SLT, 2018, arXiv preprint arXiv:1807.10857, 2018, 7 pages.

A. Kannan, et al., "An analysis of incorporating an external language model into a sequence-to-sequence model," ICASSP, 2018, arXiv preprint arXiv:1712.01996 (dated Dec. 6, 2017), 5 pages.

Anuroop Sriram, et al., Cold fusion: Training seq2seq models together with language models, arXiv preprint arXiv:1708.06426, 2017, 7 pages.

Jan Chorowski, et al., "Attention-based models for speech recognition," arXiv preprint arXiv:1506.07503, 2015, 19 pages.

(56) References Cited

OTHER PUBLICATIONS

Ashish Vaswani, et al.,, "Attension is all you need," 31st Conference on Neural Information Processing Systems (NIPS 2017), 11 pages.

Zhengkun Tian, et al., Self-attention transducers for end-to-end speech recognition, Interspeech, 2019, arXiv preprint arXiv:1909.13037, 2019, 5 pages.

Ching-Feng Yeh, et al., "Transformer-transducer: End-to-end speech recognition with self-attention," arXiv preprint arXiv:1910.12977, 2019, 5 pages.

Qian Zhang, et al., Transformer transducer: A streamable speech recognition model with transformer encoders and mn-t loss, ICASSP, 2020, arXiv:2002.02562, 2020, 5 pages.

Sepp Hochreiter, et al., "Long short-term memory," Neural Computation, 1997, vol. 9, No. 8, pp. 1735-1780, retrieved from https://www.researchgate.net/publication/13853244_Long_Short-term_Memory, pp. 1-32.

M. Schuster, et al., "Bidirectional recurrent neural networks," IEEE Transactions on Signal Processing, Nov. 1997, vol. 45, No. 11, pp. 2673-2681.

Jacob Devlin, et al., "Bert: Pre-training of deep bidirectional transformers for language understanding," Proceedings of NAACL-HLT 2019, Association for Computational Linguistics, 2019, pp. 4171-4186.

Julia Turc, et al., "Well-read students learn better: On the importance of pre-training compact models," arXiv preprint arXiv:1908.08962v2, 2019, pp. 1-13.

Diederik Kingma, et al., "Adam: A method for stochastic optimization," published as a conference paper at ICLR 2015, arXiv preprint arXiv:1412.6980v5, Apr. 23, 2015, 13 pages.

* cited by examiner

AUTOMATIC SPEECH RECOGNITION

CROSS REFERENCE TO RELATED APPLICATION

This application claims the benefit of priority of U.S. Provisional Patent Application No. 63/217,592, filed Jul. 1, 2021 and entitled "AUTOMATIC SPEECH RECOGNITION," in the names of Jing Liu, et al., which is herein incorporated by reference in its entirety.

BACKGROUND

Spoken language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
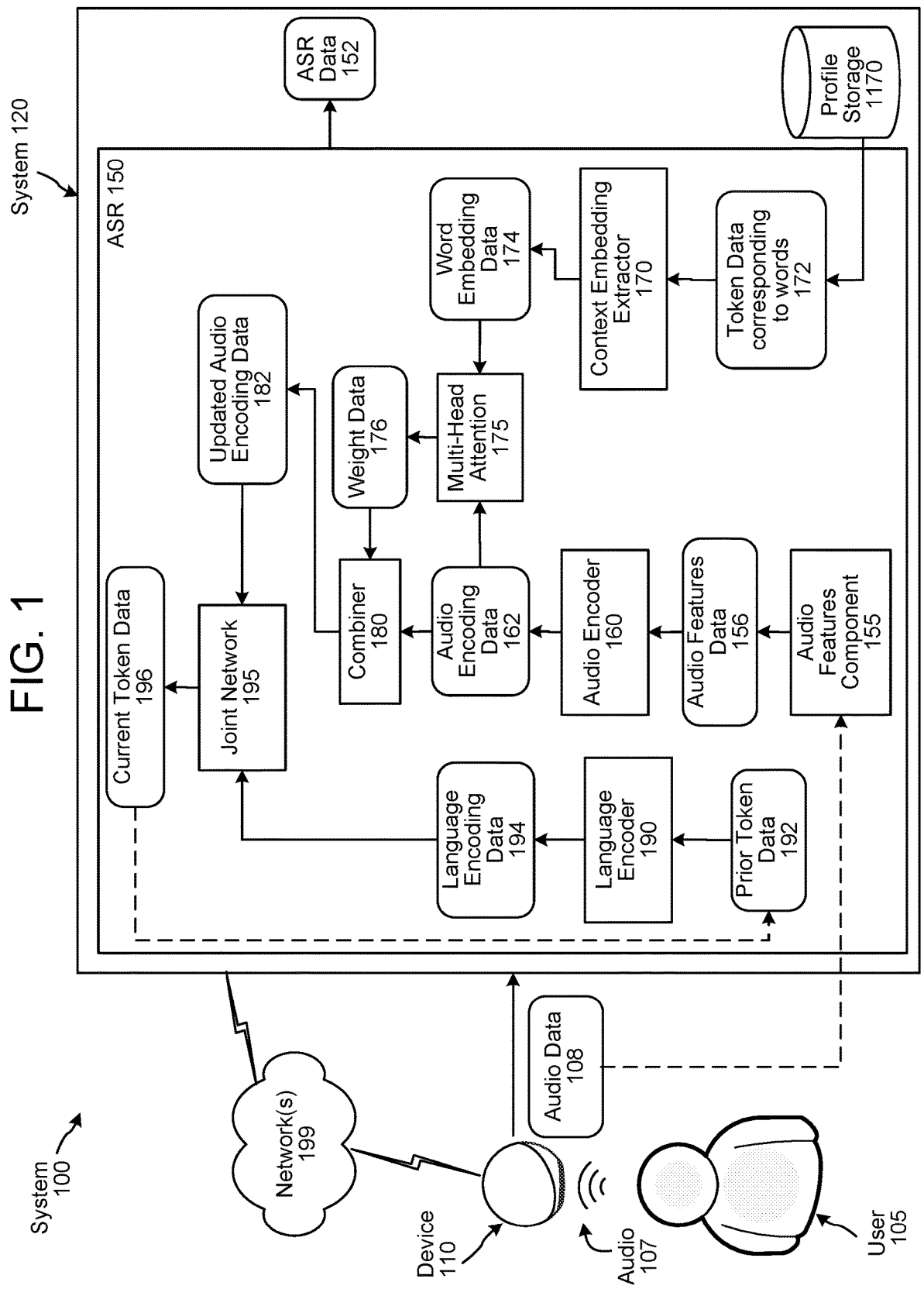
FIG. 1 is a conceptual diagram illustrating an example configuration of a system for performing automatic speech recognition (ASR) using context data from a user profile, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play music by [artist]," a system may output music sung by the indicated artist. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

Certain speech processing systems may employ, what is referred to as, end-to-end ASR processing techniques. In the end-to-end ASR processing technique, a system maps a sequence of input acoustic features into a sequence of phonemes or words. Such end-to-end ASR processing techniques can use a boosting mechanism to help recognize relatively rare words, such as words that are personalized for a user (e.g., a contact name, a device name, etc.), that appear relatively infrequently in the training data used to configure the system. For example, a boosting mechanism can be used to rescore the predicted output, an external language model can based on personalized words can be used, personalized words can be included in training data, etc., so that the system can recognize these relatively rare words.

Some embodiments of the present disclosure improves the state of the art by, among other things, using a neural-based approach that enables an end-to-end ASR system to leverage contextual information, from a user profile, to improve ASR performance. A system of the present disclosure can encode context data, which may be represented by words from the user profile, to leverage the corresponding semantic information in performing ASR. The system further uses an attention mechanism (e.g., a multi-head attention mechanism) to determine a relevance of the context data to a spoken input from a user.

For example, a user may say "call Lenon," which may be recognized as "call lemon" by an ASR system. The system of the present disclosure may determine encoded context data based on a contact name "Lenon" included in the user profile, and may use the attention mechanism to process the encoded context data and encoded audio feature data corresponding to audio data representing the spoken input "call Lenon." Based on processing by the attention mechanism, the system may determine that the encoded context data (corresponding at least to the word "Lenon") is relevant to the encoded audio feature data, and may thus determine that the user said "Lenon." The system, in some embodiments, may determine weight data that may assign a weight to certain audio features, represented in the encoded audio feature data, that correspond to the context data.

In some embodiments, the system employs the attention mechanism at an output of an audio encoder (encoded audio feature data), rather than an output of a language encoder (encoded language data). In other embodiments, the system employs the attention mechanism at the output of the language encoder. In yet other embodiments, the system employs the attention mechanism at both—the output of the audio encoder and the output of the language encoder.

Techniques of the present disclosure improve a user experience with speech processing systems. The present system learns to apply more attention to audio frames that are more relevant to context data for a user (e.g. from personalized contact names, personalized device names, etc.). Use of the techniques of the present disclosure increases ASR accuracy performance. Additionally, the runtime memory footprint is also reduced since an external fusion language model is not needed to recognize rare words.

As used herein, "attention" is a technique in machine learning (ML) that may mimic cognitive attention. Use of attention, for example with neural networks, may enhance the important parts of input data and may help fade out the rest. The concept being that the neural network should devote more computing power on that small but important part of the input data. Which part of the input data is more important than others depends on the context, which in this case are the words derived from the user profile data, and may be learned through training data by gradient descent.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 configured to perform ASR processing using context data from a user profile. As shown in FIG. 1, the system 100 may include a device 110, local to a user 105, in communication with a system 120 across one or more networks 199. The network(s) 199 may include the Internet and/or any other wide- or local-area network, and may include wired, wireless, and/or cellular network hardware. Although the figures and discussion of the present disclosure illustrate certain components, there may be fewer or more components implemented by the system 100 without departing from the present disclosure.

The system 120 may be a speech processing system configured to process spoken natural language inputs using at least an ASR component 150. The system 120 may include other components, shown in and described below in relation to FIG. 11, to facilitate speech processing and in generating a response to a user input.

Referring to FIG. 1, the user 105 may speak an input, and the device 110 may capture audio 107 representing the spoken input. The device 110 may send audio data 108, corresponding to the audio 107, to the system 120 for processing. The audio data 108 may be derived from the audio 107. In some embodiments, the audio data 108 may be determined in a similar manner as audio data 1111 is determined, which is described below in relation to FIG. 11. For example, the audio data 108 may be a portion of the spoken input that follows a wakeword. The audio data 108 may be a Fast Fourier Transform (FFT) representation of the audio 107.

The audio data 108 may be processed by the ASR component 150 of the system 120. In some embodiments, the ASR component 150 may be included at the device 110, as shown and described below in relation to FIG. 12. The ASR component 150 may include multiple components to process the audio data 108 and to generate ASR data 152 corresponding to one or more words spoken by the user 105. The processing performed by the ASR component 150 is described in conjunction with the processes illustrated in FIGS. 2-5. Although the figures and discussion of the present disclosure illustrate certain steps in a particular order, the steps described may be performed in a different order (as well as certain steps removed or added) without departing from the present disclosure.

Some embodiments, the ASR component 150 may employ a transformer-transducer architecture for processing audio data and generating ASR data. To inject the contextual information in ASR processing, the transformer-transducer architecture of the ASR component 150 includes two additional components: (1) a context embedding extractor 170 and (2) a multi-head attention component 175 as shown in FIG. 1.

Figure 2:
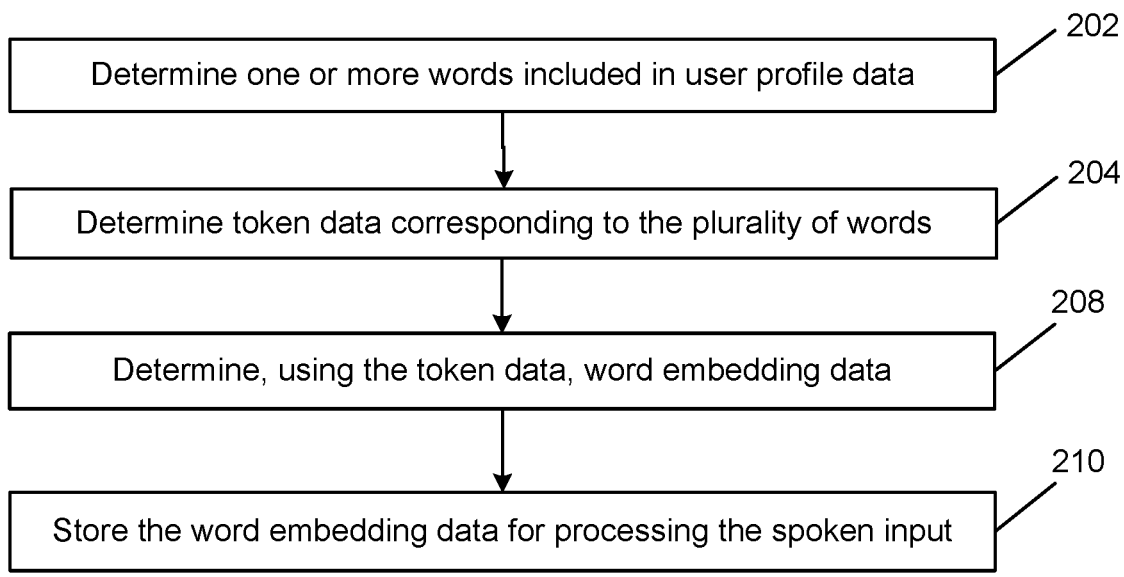
FIG. 2 shows an example process for determining word embedding data, which may be performed by an ASR component, according to embodiments of the present disclosure.

In some embodiments, the ASR component 150 may determine word embedding data 174 prior to receiving the audio data 108 from the device 110. In other embodiments, the ASR component 150 may determine the word embedding data 174 after receiving the audio data 108. FIG. 2 illustrates an example process for determining the word embedding data 174. At a step 202, the ASR component 150 may determine one or more words included in user profile data associated with the user 105 and stored in a profile storage 1170. The plurality of words may correspond to entities, phrases, or other words defined/provided by the user 105. The system 120 may identify the user 105 and determine a profile identifier corresponding to the user 105 as described below in relation to FIGS. 13 and 14. The ASR component 150 may determine the user profile data associated with the profile identifier in the profile storage 1170. The plurality of words, determined by the ASR component 150, may correspond to personalized words and entities stored in the user profile data. As described below, the user profile data may store data corresponding to the user 105. The user profile data, for example, may include a contact catalog including one or more contact names, corresponding phone numbers, corresponding email addresses, and/or other information that can be used to establish communications (e.g., voice communications, phone calls, text communications, SMS messaging, MMS messaging, etc.) with another user. As another example, the user profile data may include a device name catalog including one or more device names, corresponding device identifiers, and other information that can be used to control certain devices (e.g., smart home devices such as speakers, TVs, lights, kitchen appliances, door locks, thermostats, etc.) via the system 120. Such device names may be defined by the user 105 and may be used by the user 105 to identify a specific device. For example, a first device name may be "kitchen lights" and when a user says "turn on the kitchen lights," the system 120 may cause the lights in the kitchen to turn on. As another example, a second device name may be "[person]'s TV," which may be associated with a TV in the [person]'s room. The user profile data, for example, may include personalized lists (e.g., shopping lists, wish lists, etc.) created based on inputs received from the user 105. Such lists may relate to a shopping skill.

The user profile data may include other personalized words and entities, such as, one or more personalized wakewords to trigger different devices. For example, a first wakeword may cause a first device 110a to wake/activate, while a second wakeword may cause a second device 110b to wake/activate. Other examples of personalized words and entities may include a personalized content catalog (e.g., music playlists, purchased movies, purchased TV shows, purchased songs, subscribed podcasts, etc.), personalized skill invocation phrases (e.g., "open [skill name]", "start [skill name]", drive with [skill name]," "start cooking", etc.), and the like.

In some embodiments, the ASR component 150 may determine the plurality of words from the profile storage 1170. In other embodiments, another component of the system 120 may determine the plurality of words from the profile storage 1170.

In some embodiments, the plurality of words may include all of the personalized words in the user profile data. In other embodiments, the plurality of words may include a subset of the personalized words in the user profile data. In such embodiments, the subset of personalized words may be based on selection of one or more catalogs in the user profile data, where the selection of the catalogs may be based on an indication of which domain or skill component corresponds to the user input. For example, in some cases, the system 120 may track a dialog, between the user 105 and the device 110, involving the user 105 providing multiple user inputs and the system 120 generating responses to the user inputs. Based on the prior user inputs of the dialog, the system 120 may determine a domain or skill component corresponding to the dialog, and based on this domain or skill component the system may select one or more catalogs from the user profile data to determine the plurality of words from. As a non-limiting example, the user 105 may say a first user input "I want to make a phone call," the system 120 may determine that a communications skill component is capable of performing an action responsive to the first user input, and then the user 105 may say a second user input "please call Lenon at his office." Based on the system 120 determining that the communications skill component is capable of performing an action responsive to the first user input, the ASR component 150 may select the contact catalog from the user profile data to determine the plurality of words at step 202.

At a step 204, the ASR component 150 may determine token data 172 corresponding to the plurality of words. The ASR component 150 may determine the token data 172 by applying a tokenization technique to the plurality of words. Tokenization is a process of grouping text into meaningful chunks like subwords or subword units (i.e., a string of characters). For example, using tokenization, phrases may be broken into words, and words may be broken into subwords like "ing" or "es." As part of tokenization, repeated words and phrases may be eliminated, and may be represented as a single set of tokens. For example, a device name catalog may include a first device name "kitchen lights" and a second device name "kitchen speaker." The token data 172 corresponding to these example device names may be {kitchen}, {lights} and {speaker}. Example tokenization techniques that may be used by the ASR component 150 include Byte Pair Encoding (BPE), Sentencepiece, or other techniques.

In some embodiments, the token data 172 may be based on words that are not included in the user profile data. The token data 172 may be based on words included in output data that may be presented to the user 105. The token data 172 may be based on words included user inputs that may be provided by the user 105. For example, the token data 172 may be based on words spoken by the user 105 or outputted by the system 120 during a turn-by-turn dialog session. In another example, the token data 172 may be based on content outputted by the system 120, such as a commercial, information on how to use a skill, a notification, a movie, an e-book, etc. In some embodiments, the token data 172 may be based on output data that was recently outputted (e.g., within a period of time, such as last minute, last 24 hours, etc.).

In some embodiments, another component may be determine the token data 172 using the plurality words, and may send the token data 172 to the ASR component 150 for further processing.

At a step 208, the ASR component 150, using a context embedding extractor 170 and the token data 172, may determine the word embedding data 174. As described herein, the contextual information considered during ASR processing is derived from personalized information provided by the user 105, such as, user-defined device names, contact names, wakewords, skill invocation phrases, etc. Such words and phrases are represented in the token data 172, which is fed into the context embedding extractor 170 to produce the word embedding data 174, which is fixed dimensional vector representations of k words ($w_k$) from the user profile data. The word embedding data 174 may be a vector or a matrix that is represented as follows:

$$h_k^{CE} = f(w_k), \text{ where } h_k^{CE} \in \mathbb{R}^{d \times 1}$$

In some embodiments, the context embedding extractor 170 may employ a bi-directional LSTM (BLSTM) technique. The last state of the BLSTM may be used to determine the word embedding data 174. In some embodiments, the BLSTM-based context embedding extractor 170 may be trained from scratch along with the rest of the components of the ASR component 150.

In other embodiments, the context embedding extractor 170 may employ a Bidirectional Encoder Representations from Transformer (BERT) technique. In some embodiments, the BERT-based context embedding extractor 170 may be pre-trained with a certain amount of text data (or token data). Using a pre-trained BERT technique, the context embedding extractor 170 may bring strong prior semantic knowledge to guide the training of the rest of the components of the ASR component 150. In some embodiments, the BERT-based context embedding extractor 170 may be frozen, during training, and only the parameters (e.g., model weights) of the rest of the components of the ASR component are updated during training.

At a step 210, the ASR component 150 may store the word embedding data 174 for processing the spoken input. The word embedding data 174 may be stored outside of the ASR component 150, in some embodiments, in a data storage (not shown in FIG. 1). The ASR component 150 may process the audio data 108 on a sequential frame-by-frame basis, during which, the word embedding data 174 remains the same. For example, the ASR component 150, as described below, processes first audio feature data corresponding to a first set of audio frames from the audio data 108 to determine token data (e.g., subwords) corresponding to the first set of audio frames, then processes second audio feature data corresponding to a second set of audio frames from the audio data 108 to determine token data corresponding to the second set of audio frames. During these two iterations, the ASR component 150 may use the stored word embedding data 174, instead of generating the word embedding data 174 during each iteration.

In some embodiments, the word embedding data 174 may be determined upon the user 105 providing the plurality of words to the system 120. Thereafter, the word embedding data 174 may be updated when the user profile data associated with the user identifier for the user 105 is updated. For example, the word embedding data 174 may be updated when the user 105 adds a new contact name to a contact catalog stored in the profile storage 1170, adds a new device name to a device catalog in the profile storage 1170, updates a contact name in the contact catalog, updates a device name in the device catalog, deletes a contact name from the contact catalog, deletes a device name from the device catalog, etc.

Figure 3:
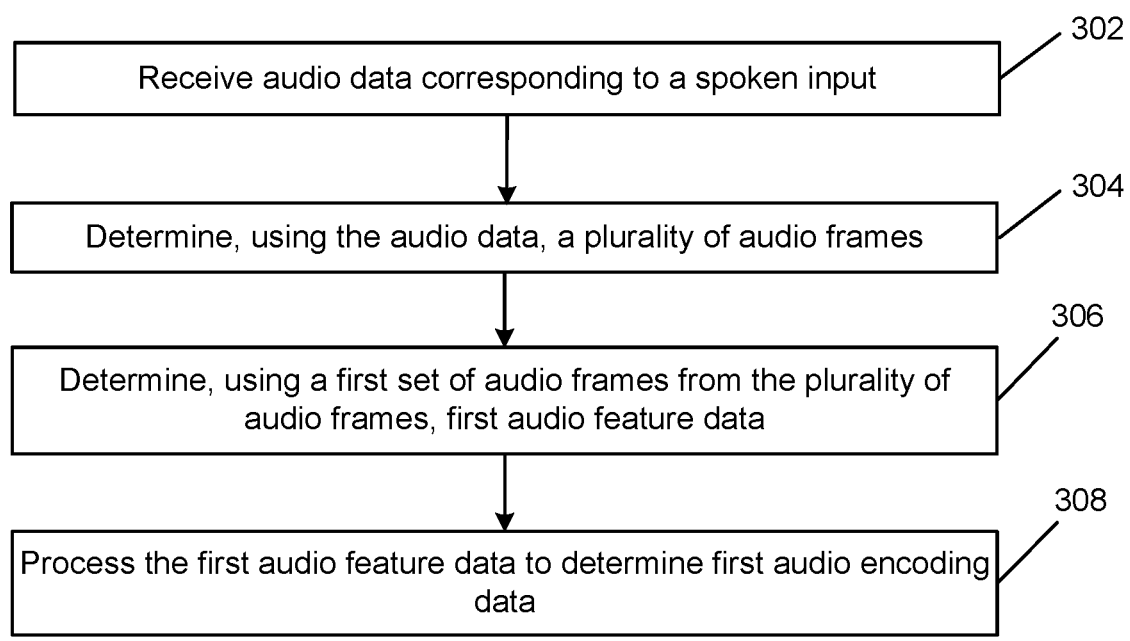
FIG. 3 shows an example process for determining audio feature data, which may be performed by the ASR component, according to embodiments of the present disclosure.

FIG. 3 illustrates an example process for determining audio encoding data as part of ASR processing for a spoken input. At a step 302, the ASR component 150 may receive the audio data 108 corresponding to the spoken input provided by the user 105. As described below in relation to FIG. 11, an orchestrator component 1130 may send the audio data 108 to the ASR component 150. The ASR component 150 may send the audio data 108 to an audio features component 155 shown in FIG. 1.

At a step 304, the audio features component 155 may determine, using the audio data 108, a plurality of audio frames. In some embodiments, the audio features component 155 may perform windowing functions on the audio data 108 to determine the plurality of audio frames. The size of each audio frame may depend upon system configuration. In an example, each audio frame may include twenty-five (25) milliseconds of audio data, with an overlap of a next audio frame of 10 milliseconds of audio data, thus resulting in a sliding window processing of the audio data 108. Performing a windowing function may include multiplying a time record by a finite-length window with an amplitude that varies smoothly and gradually toward zero at its edges. By performing such, the endpoints of the waveforms of respective audio frames of the audio data 108 meet, resulting in a continuous waveform without sharp transitions.

At a step 306, the audio features component 155 may determine, using a first set of audio frames from the plurality of audio frames, first audio features data 156. The number of audio frames in a set may depend on system configurations. For example, the first set of audio frames may be six frames and may be centered at frame t. Such a first set of audio frames may be represented as [t−L:t+R]. The audio features component 155 may perform a Fast Fourier transform (FFT) that converts the waveforms of the first set of audio frames from the time domain to the frequency domain. The first audio features data 156 may be the frequency domain representation of the first set of audio frames. While processing a second set of audio frames, the audio features component 155 may determine second audio features data 156. Audio processing techniques other than or in addition to FFT may be used to transform audio data (e.g., waveforms) into audio feature data that can be processed as needed. In some embodiments, the first audio features data 156 may be log-mel filter bank energy (LFBE) features.

At a step 308, an audio encoder 160 (shown in FIG. 1) may process the first audio features data 156 to determine first audio encoding data 162. The audio encoder 160 may be a machine learning model. The audio encoder 160, in some embodiments, may be comprised of stacked self-attention transformer layers. The audio encoder 160 may process the first audio features data 156 (represented as x in the equation below), corresponding to the first set of audio frames [t−L: t+R], to produce the first audio encoding data 162 for the audio frame t, represented as $h_t^{AE}$ below:

$$h_t^{AE} = f(x_{t-L:t+R}), \text{ where } h_t^{AE} \in \mathbb{R}^{d_1=1} \text{ and } d_1 \text{ is the embedding size.}$$

The audio encoding data 162 may be a hidden representation (or latent representation) of the first audio features data 156, and may be represented as a feature vector. In some embodiments, the audio encoder 160 may perform a similar function as an acoustic model in a hybrid ASR system (a non-transformer-transducer based ASR system). While processing a second set of audio frames, the audio encoder 160 may determine second audio encoding data 162.

Figure 4:
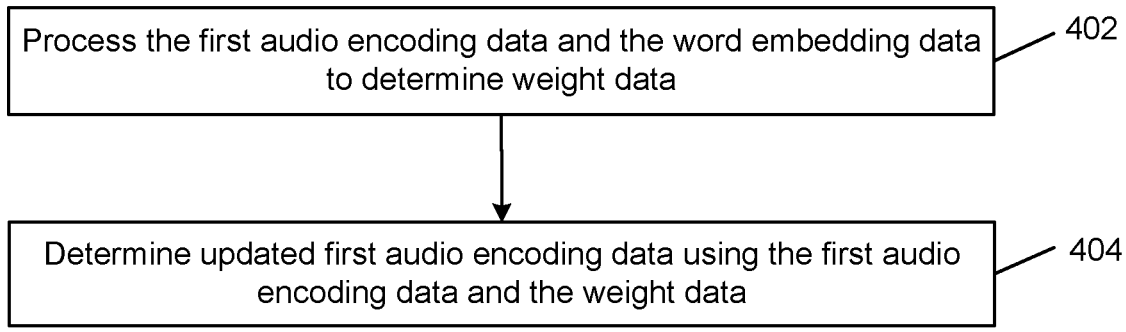
FIG. 4 shows an example process for determining weight data, which may be performed by the ASR component, according to embodiments of the present disclosure.

FIG. 4 illustrates an example process for determining updated first audio encoding data 182 based on the word embedding data 174. At a step 402, a multi-head attention component 175 (shown in FIG. 1) may process the first audio encoding data 162 and the word embedding data 174 to determine weight data 176. The multi-head attention component 175 is configured to learn the relevance of personalized words and phrases to a spoken input. Using the output of the multi-head attention component 175, the ASR component 150 can apply more attention to the audio frames that correspond to personalized words for the user 105, and give these audio frames more penalties when the predicted token is incorrect. The multi-head attention component 175 may be configured to learn relationships between the word embedding data 174 and the audio encoding data 162.

The multi-head attention component 175 may use 3 types of inputs: query (Q), key (K) and value (V). In some embodiments, these inputs may be defined as follows:

$$Q^{cb} = \sigma(XW^{cb,q} + 1(b_i^{cb,q})^T)$$

$$K^{cb} = \sigma(CW^{cb,k} + 1(b_i^{cb,k})^T)$$

$$V^{cb} = \sigma(CW^{cb,v} + 1(b_i^{cb,v})^T)$$

where $X = [h_1^{AE}, \ldots, h_{\mathcal{T}}^{AE}]^T \in \mathbb{R}^{\mathcal{T} \times d}$ is the outputs of the audio encoder 160 for a spoken input, and $\mathcal{T}$ is the number of audio frames from the audio data 108. $C = [h_1^{CE}, \ldots, h_K^{CE}]^T \in \mathbb{R}^{K \times d}$ is the word embedding data 174, K is the number of words to be considered from the user profile data, $\sigma(.)$ is an activation function $W^{cb*} \in \mathbb{R}^{d \times d}$ and $b^{cb},* \in \mathbb{R}^{d \times 1}$ are learnable weight and bias parameters, and $1 \in \mathbb{R}^{\mathcal{T} \times 1}$ is an all-ones vector.

The cross-attention between the audio encoding data 162 and the word embedding data 174 may then be computed by:

$$H^{cb} = \text{Softmax}\left(\frac{Q^{cb}(K^{cb})^T}{\sqrt{d}}\right)V^{cb},$$

where the scaling $1/\sqrt{d}$ is for numerical stability. The multi-head attention component 175 may then use the resulting attention scores (Softmax part of the above equation) to determine a weighted sum of word embedding data 174 in order to inject contextual information into the audio encoding data 162, to produce weight data 176, which may be a matrix $H^{cb} \in \mathbb{R}^{T \times d}$.

The weight data 176 may be a vector or a matrix of weight values, where each weight value may correspond to a particular portion of the audio encoding data 162. The weight value may generally indicate whether the corresponding portion of the audio encoding data 162 is similar to a portion of the word embedding data 174, thus, indicating whether an audio frame (corresponding to the portion of the audio encoding data 162) represents a word(s) from the user profile data. The weight value may be 1 or 0. In other cases, the weight value may be a number between 0 and 1 (or between another numerical range, such as, 0 and 100, etc.), and may indicate how similar the corresponding portion of the audio encoding data 162 is to a portion of the word embedding data 174, or may indicate a likelihood/probability of the corresponding portion of the audio encoding data 162 being similar to a portion of the word embedding data 174.

The weight values included in the weight data 176 are then fused with the audio encoding data 162, using a combiner component 180 (shown in FIG. 1). At a step 404, the combiner component 180 may determine updated first audio encoding data 182 using the first audio encoding data 162 and the weight data 176. In some embodiments, the combiner component 180 may employ one or more of LayerNorm layers, a concatenation layer and a feed-forward layer in order to match the dimension of an output of a language encoder 190.

The processing done by the combiner component 180 to integrate the contextual information into audio encoding data may be described by the following equations:

$H^{concat} = [\text{LayerNorm}(X), \text{LayerNorm}(H^{cb})]$ and $H^{CA} = \text{FeedForward}(H^{concat})$, where $H^{concat} \in \mathbb{R}^{T \times 2d}$, and $H^{CA} = [h_1^{CA}, \ldots, h_t^{CA}, \ldots h_T^{CA}] \in \mathbb{R}^{T \times d}$.

The updated first audio encoding data 182 may be the first audio encoding data 162 with certain portions being weighted higher than other portions, where the higher weighted portions may correspond to one or more words from the user profile data.

In some embodiments, the ASR component 150 employs a transformer-based technique, in which case the multi-head attention component 175 employs a multi-head attention technique. In other embodiments, where the ASR component 150 employs techniques other than a transformer-based technique, the multi-head attention component 175 may be another type of attention technique.

The multi-head attention component 175 may include multiple attention mechanisms (e.g., 4 attention heads) so that dimensions of input sequences/data are split into multiple chunks with multiple projections, and each chunk goes through an independent separate attention mechanism, then the encodings from each chunk are concatenated and then projected to produce the output encoding of the multi-head attention component 175.

Figure 5:
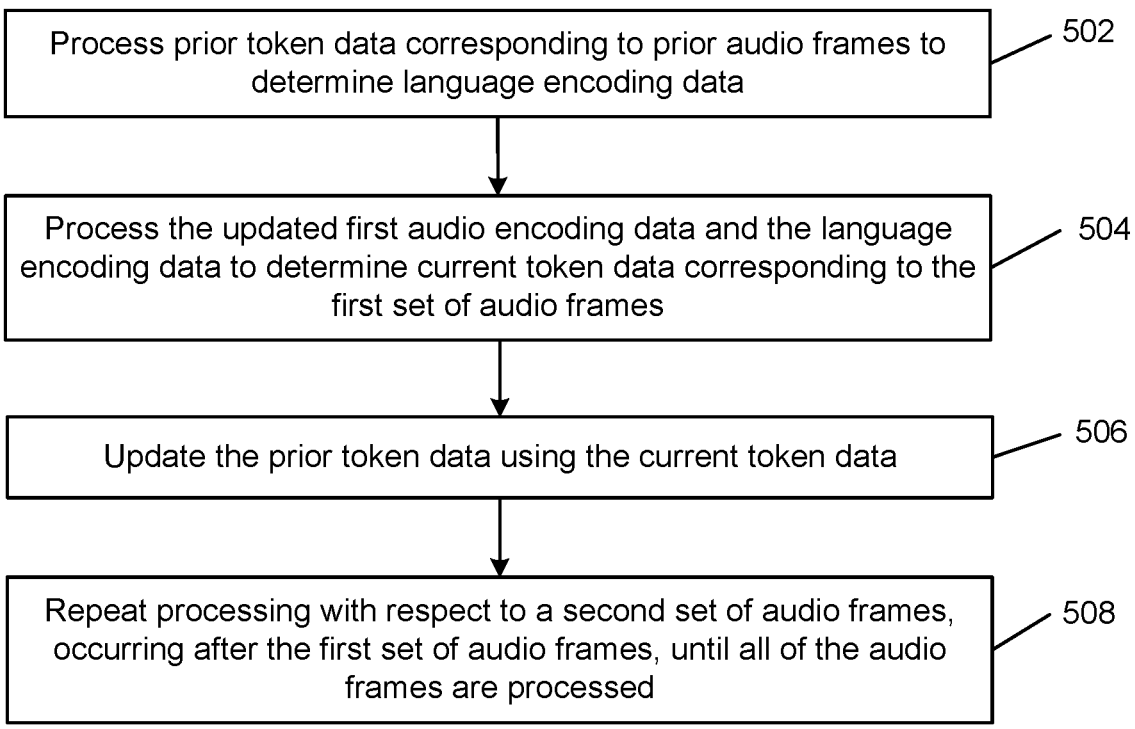
FIG. 5 shows an example process for determining token data, which may be performed by the ASR component, according to embodiments of the present disclosure.

FIG. 5 illustrates an example process for determining language encoding data and token data corresponding to the audio data 108. At a step 502, a language encoder 190 may process prior token data 192 corresponding to prior audio frames to determine language encoding data 194. The prior token data 192 may correspond to one or more sets of audio frames that occur prior (with respect to time) to the first set of audio frames of the audio data 108. The prior token data 192 may be determined by the ASR component 150 by processing the one or more prior occurring sets of audio frames as described above (in relation to FIGS. 2, 3, and 4). The prior token data 192 may correspond to one or more subwords determined to be represented in the audio data 108.

In the case that the first set of audio frames is sequentially the first occurring frames in the audio data 108, then the prior token data 192 may be null. In such cases, the current token data 196 for the first set of audio frames may be based only on the audio encoding data.

The language encoder 190 may employ one or more types of machine learning models.

In some embodiments, the language encoder 190 may be a stacked transformer network, which uses previous Li non-blank tokens y to generate the language encoding data 194. The language encoding data 194 may be represented as:

$$h_u^{LE} = f^{pred}(y_{u-L_1:u})$$

where $h_u^{LE} \in \mathbb{R}^{d_2 \times 1}$, and $d_2$ is the embedding size.

The language encoder 190, in some embodiments, may perform similar functionalities as a language model in a hybrid ASR system (a non-transformer-transducer based ASR system).

At a step 504, a joint network 195 (shown in FIG. 1) may process the updated first audio encoding data 182 and the language encoding data 194 to determine current token data 196 corresponding to the first set of audio frames. The joint network 195 may combine the updated audio encoding data 182 and the language encoding data 194 to produce the following new embedding:

$$z_{t,u} = \phi(Uh_t^{AE} + Vh_u^{LE} + b)$$

where U, V, and b are learnable parameters to project the audio encoding data and the language encoding data into the same dimension. $\phi$ is a nonlinear function (e.g., tanh). The joint network 195 then feeds $z_{t,u}$ into a liner layer and softmax layer to produce a probability distribution over output tokens plus a blank symbol. The joint network 195 may use the following:

$$h_{t,u} = Wz_{t,u} + b$$

$$p(y|t,u) = \text{Softmax}(h_{t,u})$$

where W and b are trainable parameters.

When the joint network 195 predicts a blank symbol as the token corresponding to the set of audio frames, the ASR component 150 proceeds to the audio encoding data of the next set of audio frames. When the joint network 195 predicts a non-blank token, the input to the language encoder is updated. This results in various possible alignment paths, and the sum of probabilities of these paths provides the probability of an output sequence (with non-blank outputs) given an input sequence.

At a step 506, the ASR component 150 may update the prior token data 192 using the current token data 196. The current token data 196 may be concatenated to the prior token data 192 in a sequential manner. That is, the sequence in which the tokens are included in the prior token data 192 may correspond to the sequence in which they appear in the spoken input. As such, the current token data 196 may be appended to the end of the prior token data 192.

At a step 508, the ASR component 150 may repeat processing with respect to subsequent sets of audio frames, occurring after the first set of audio frames, until all of the audio frames, of the audio data 108, are processed. In processing further audio frames, the ASR component 150 may use stored word embedding data 174. The ASR component may determine second audio encoding data 162 (using the audio encoder 160) corresponding to the second set of audio frames, may determine second weight data 176 by processing the second audio encoding data 162 and the word embedding data 174, and may determine updated second audio encoding data 182. The ASR component may also determine second language encoding data 194 based at least on the token data corresponding to the first set of audio frames, and may process the updated second audio encoding data 182 and the second language encoding data 194 using the joint network 195 to determine second current token data 196. The second current token data 196 may correspond to the second set of audio frames, and may be used to update the prior token data 192 for processing the next set of audio frames.

In some embodiments, the device 110 may send audio data as it is generated as the user 105 speaks the input. In such cases, the audio data 108 may correspond to a portion of the spoken input, and when further audio is received from the user 105, further audio data corresponding to another portion of the spoken input may be sent to the system 120 for processing. When the device 110 determines that speech of the user 105 is directed to the device 110/the system 120, then the device 110 starts sending audio data, for the audio captured so far, to the system 120, and continues to send audio data until the device 110/the system 120 determines that the user 105 has finished speaking. Thus, audio data corresponding to an entire spoken input (which may include multiple words and multiple sentences) may be received in chunks/portions by the ASR component 150.

Once all of the audio frames of the audio data 108 are processed, the ASR component 150 may determine the ASR data 152. The ASR data 152 may be a combination of the token data determined based on sequential processing of the audio frames of the audio data 108. The ASR data 152 may include tokens corresponding to the entirety of the spoken input provided by the user 105 and represented in the entirety of the audio data 108. The ASR data 152 may also include a confidence score representing a confidence of the ASR component 150 in determining the ASR data 152 (i.e. the words spoken by the user 105).

In some embodiments, the ASR data 152 may be a N-best list of ASR hypotheses, where each ASR hypothesis includes token data corresponding to the entirety of the spoken input and a confidence score in determining that token data. The ASR hypotheses may be based on the probability distribution, determined by the joint network 195, over potential output tokens. For example, for the first set of audio frames, the joint network 195 may determine that a first token (e.g., "bad"), with a first probability, is represented in the first set of audio frames, and a second token (e.g., "bat"), with a second probability, is represented in the first set of audio frames. A first ASR hypothesis, of the N-best list of ASR hypotheses included in the ASR data 152, may include the first token and the first probability, and a second ASR hypothesis of the N-best list of ASR hypotheses may include the second token and the second probability. In some embodiments, the N-best list of ASR hypothesis may be determined using a breadth-first-search technique (e.g., a beam search technique).

The ASR component 150 may employ a transformer-transducer technique (e.g., a transformer transducer model) that outputs a probability distribution over output token sequences y given input audio frames x. As described above, the transformer-transducer based ASR component 150 includes the audio encoder 160 (to determine audio encoding data), the language encoder 190 (to determine language encoding data based on predicted tokens), and the joint network 195 to jointly process the audio encoding data and the language encoding data to determine an output token. As described above, the ASR component 150 also includes the multi-head attention component 175 that integrates contextual information from user profile data into the audio encoding data, which causes the probability distribution outputted by the joint network 195 to be conditionally dependent on personalized words for the user 105. Such probability distribution may be represented as:

$$p(y|t,u,k) = p(y|h_t^{AE}, h_u^{LE}, h_k^{CE}).$$

In some embodiments, the ASR component 150 may be configured using training data and a training process. In one embodiment, the different components of the ASR component 150 may be trained together and jointly optimized, for the forward path and the backward path. For example, the audio encoder 160, the language encoder 190, the context embedding extractor 170, the multi-head attention component 175, and the joint network 195 may be trained together and jointly optimized. In doing so, the parameters (e.g., weights, biases, other learnable parameters, etc.) of the different components (the audio encoder 160, the language encoder 190, the context embedding extractor 170, the multi-head attention component 175, and/or the joint network 195) are jointly updated as the training process progresses.

In some embodiments, one or more components of the ASR component 150 may be trained using generic training data (e.g., pre-trained). In some embodiments, one or more components of the ASR component 150 may be fine-tuned using user-specific data, such as, data from the user profile data associated with the user 105. For example, the context embedding extractor 170 may be pre-trained using generic training data and may be fine-tuned using personalized words from the user profile data for the user 105. In some example embodiments, the context embedding extractor 170 may be fine-tuned using a subset of personalized words from the user profile data. The subset of personalized words used for training may be based on categories of words, for example, a subset of contact names from the user's 105 contact catalog may be used, a subset of song information from the user's 105 music catalog may be used, a subset of device names from the user's 105 profile data may be used, etc.

The system 120 may be configured to respond to the user across multiple exchanges between the user 105 and the system 120. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system. A user input and performance by the system of a corresponding action responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

Figure 6:
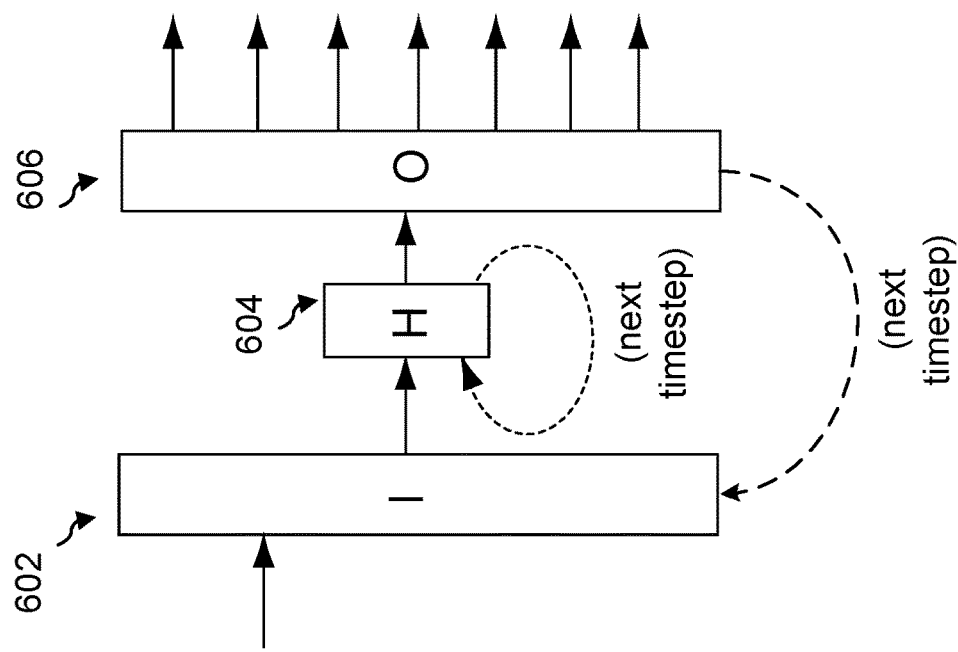
FIG. 6 illustrates a neural network for speech recognition, according to embodiments of the present disclosure.

In one aspect, one or more components of the ASR component 150 may be a neural network with recurrent connections such that the output of the hidden layer of the network feeds back into the hidden layer again for the next set of inputs. Such a neural network is illustrated in FIG. 6. Each node of the input layer 602 connects to each node of the hidden layer 604. Each node of the hidden layer 604 connects to each node of the output layer 606. As illustrated, the output of the hidden layer 604 is fed back into the hidden layer 604 for processing of the next set of inputs/the next time step. A neural network incorporating recurrent connections may be referred to as a recurrent neural network (RNN). A RNN-transducer model may feed the prediction from the output layer 606 (or a softmax layer output) to the input layer to process the next set of inputs/the next time step. In some embodiments, the ASR component 150 may be a RNN-transducer model, where the various components shown in FIG. 1 may be different layers/components of the RNN-transducer model. For example, the input to the RNN-transducer model ASR component may be audio frames and a predicted token from the previous time step (i.e. the output (predicted token) of the joint network 195 may be fed to the language encoder 190 for processing the next time step involving the next set of audio frames).

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 7:
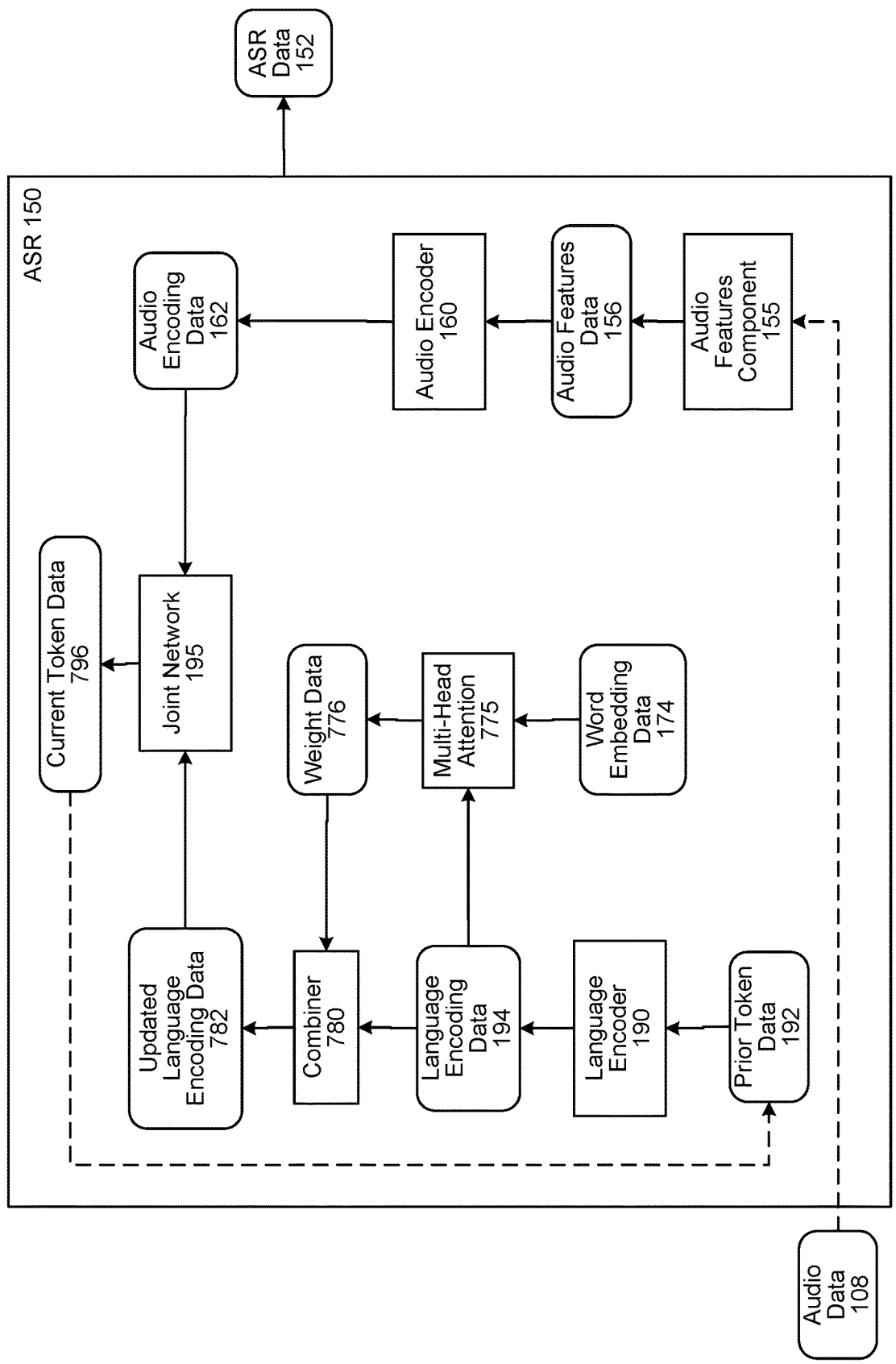
FIG. 7 is a conceptual diagram illustrating another example configuration of an ASR component that uses context data from the user profile with a language encoder output, according to embodiments of the present disclosure.

FIG. 1 shows an example configuration of the ASR component 150, where the combiner component 180 operates to integrate contextual information, from the user profile data, into the output of the audio encoder 160. FIG. 7 shows another example configuration of the ASR component 150, in which a combiner component 780 may operate to integrate contextual information, from the user profile data, into the output of the language encoder 190.

As shown in FIG. 7, the ASR component 150 may include the above-described (in relation to FIG. 1) audio features component 155, the audio encoder 160, the language encoder 190 and the joint network 195. The audio features component 155 may determine audio features data 156 corresponding to a set of audio frames corresponding to the audio data 108. The audio features data 156 may be processed by the audio encoder 160 to determine the audio encoding data 162, in a similar manner as described above in relation to FIGS. 1 and 3. The language encoder 190 may process the prior token data 192, which corresponds to audio frames occurring prior to the set of audio frames of the audio data 108, and determine the language encoding data 194, in a similar manner as described above in relation to FIG. 1 and step 502 of FIG. 5. The word embedding data 174 may be determined in a similar manner as described above in relation to FIGS. 1 and 2.

In the example embodiment of FIG. 7, the multi-head attention component 775 may process the word embedding data 174 and the language encoding data 194 to determine weight data 776. The multi-head attention component 775 is configured to learn the relevance of personalized words and phrases to a spoken input. The multi-head attention component 775 may determine a relationship (e.g., a similarity) between the word embedding data 174 and the language encoding data 194. In some aspects, this similarity is based on the prior token data 192 as the language encoding data 194 is based on the tokens predicted for prior occurring audio frames in the audio data 108. In determining the similarity or relevancy, the multi-head attention component 775 may determine whether a personalized word is represented in the spoken input based on the tokens being predicted by the ASR component 150/the joint network 195. Using the output of the multi-head attention component 775, the ASR component 150 can apply more attention to the tokens that correspond to personalized words for the user 105, and give these tokens more penalties when the next predicted token is incorrect.

The weight data 776 may be a vector or a matrix of weight values, where each weight value may correspond to a particular portion of the language encoding data 194. The weight value may generally indicate whether the corresponding portion of the language encoding data 194 is similar to a portion of the word embedding data 174, thus, indicating whether a token(s) (corresponding to the portion of the language encoding data 194) represents a word(s) from the user profile data. The weight value may be 1 or 0. In other cases, the weight value may be a number between 0 and 1 (or between another numerical range, such as, 0 and 100, etc.), and may indicate how similar the corresponding portion of the language encoding data 194 is to a portion of the word embedding data 174, or may indicate a likelihood/probability of the corresponding portion of the language encoding data 194 being similar to a portion of the word embedding data 174.

The multi-head attention component 775 may use 3 types of inputs: query, key and value. The multi-head attention component 775 may include multiple attention mechanisms (e.g., 4 attention heads) so that dimensions of input sequences/data are split into multiple chunks with multiple projections, and each chunk goes through an independent separate attention mechanism, then the encodings from each chunk are concatenated and then projected to produce the output encoding of the multi-head attention component 775. In some embodiments, the multi-head attention component 775 may be another type of attention mechanism.

Continuing with the example embodiment shown in FIG. 7, the ASR component 150 may process the weight data 776 and the language encoding data 194 using a combiner component 780 to determine updated language encoding data 782. The weight values included in the weight data 776 may be fused with the language encoding data 194 by the combiner component 780. In some embodiments, the combiner component 780 may employ one or more of Layer-Norm layers, a concatenation layer and a feed-forward layer in order to match the dimension of an output of the audio encoder 160. The combiner component 780 may be configured to integrate the contextual information, from the user profile data, into the language encoding data 194. The updated language encoding data 782 may be the language encoding data 194 with certain portions being weighted higher (based on the weight data 776) than other portions, where the higher weighted portions may correspond to one or more words from the user profile data.

The joint network 195, shown in FIG. 7, may process the updated language encoding data 782 and the audio encoding data 162 to determine current token data 796. The current token data 796 may include one or more tokens predicted by the joint network 195 as corresponding to the set of audio frames represented in the audio encoding data 162. In this example embodiment, the joint network 195 determines the current token data 796 based on the updated language encoding data 782 incorporating contextual information from the user profile data for the user 105.

If the current token data 796 is not a blank symbol, then the ASR component 150 may update the prior token data 192 to include the current token data 796. For the next time step processing involving the next set of audio frames in the audio data 108, the language encoder 190 may use the updated prior token data for processing.

After all the audio frames of the audio data 108 are processed, the ASR component 150 may determine the ASR data 152, in a similar manner as described above in relation to FIG. 1.

Figure 8:
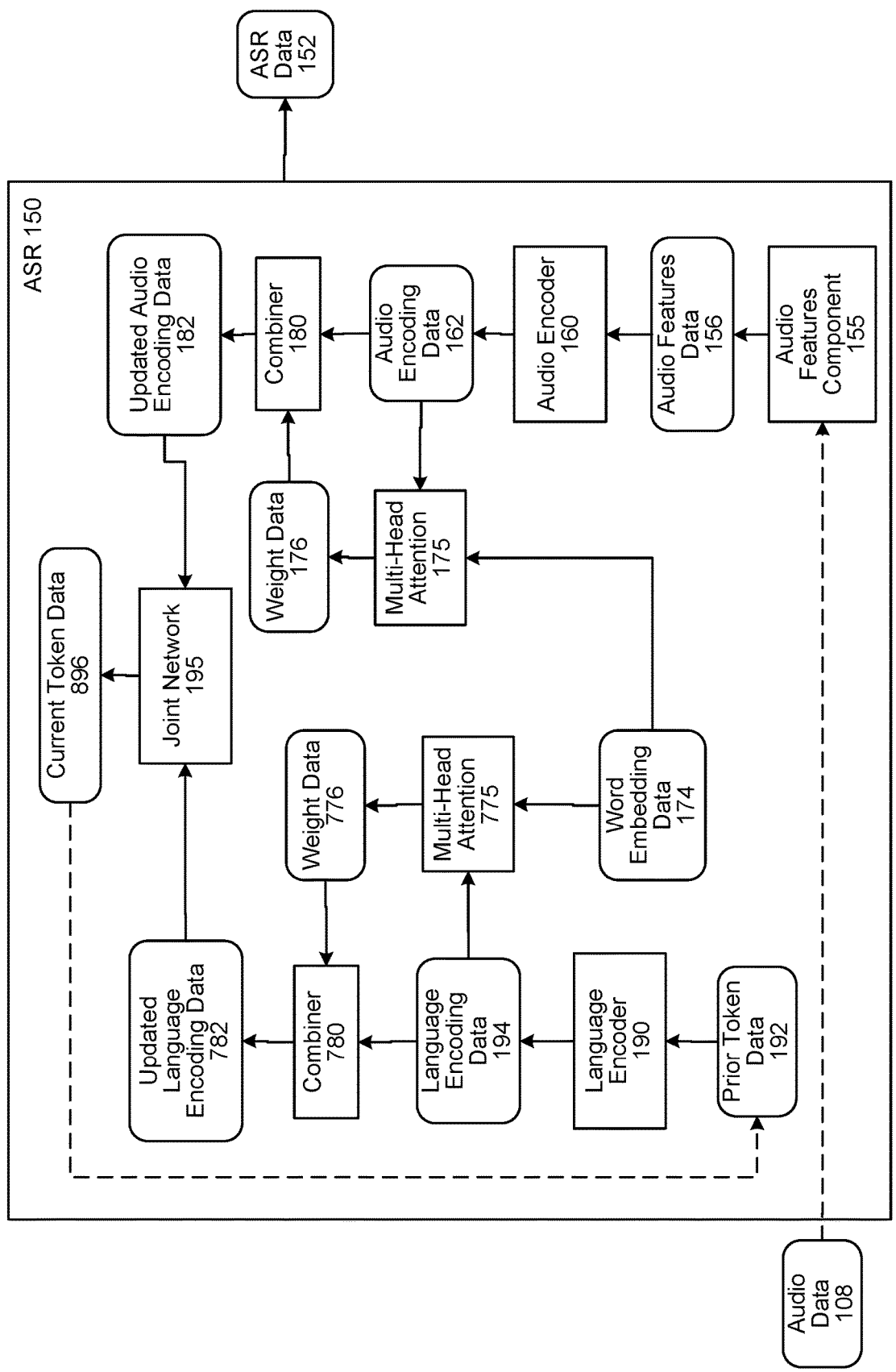
FIG. 8 is a conceptual diagram illustrating another example configuration of an ASR component that uses context data from the user profile with the language encoder output and the audio encoder output, according to embodiments of the present disclosure.

FIG. 8 illustrates another example embodiment of the ASR component 150, where contextual information from the user profile data is integrated into both the language encoder output and the audio encoder output. In this example embodiment, the ASR component 150 may include the audio features component 155, the audio encoder 160, the multi-head attention component 175, and the combiner component 180 described above in relation to FIG. 1. In this example embodiment, the ASR component 150 may also include the language encoder 190, the multi-head attention component 775 and the combiner component 780 described above in relation to FIG. 7.

As described above, the multi-head attention component 175 may be configured to determine a relationship (e.g., a similarity) between the word embedding data 174 and the audio encoding data 162. The weight data 176 may be based on portions of the audio encoding data 162 corresponding to one or more words represented in the word embedding data 174. The updated audio encoding data 182, determined by the combiner component 180, may be based on the weight data 176 and the audio encoding data 162.

As described above, the multi-head attention component 775 may be configured to determine a relationship (e.g., a similarity) between the word embedding data 174 and the language encoding data 194. The weight data 776 may be based on portions of the language encoding data 194 corresponding to one or more words represented in the word embedding data 174. The updated language encoding data 782, determined by the combiner component 780, may be based on the weight data 776 and the language encoding data 194.

The joint network may process the updated audio encoding data 182 and the language encoding data 782 to determine the current token data 896. The current token data 896 may include one or more tokens predicted by the joint network 195 as corresponding to the set of audio frames represented in the audio encoding data 162. In this example embodiment, the joint network 195 determines the current token data 896 based on both the updated language encoding data 782 and the updated audio encoding data 182 incorporating contextual information from the user profile data for the user 105.

If the current token data 896 is not a blank symbol, then the ASR component 150 may update the prior token data 192 to include the current token data 896. For the next time step processing involving the next set of audio frames in the audio data 108, the language encoder 190 may use the updated prior token data for processing.

After all the audio frames of the audio data 108 are processed, the ASR component 150 may determine the ASR data 152, in a similar manner as described above in relation to FIG. 1.

Figure 9:
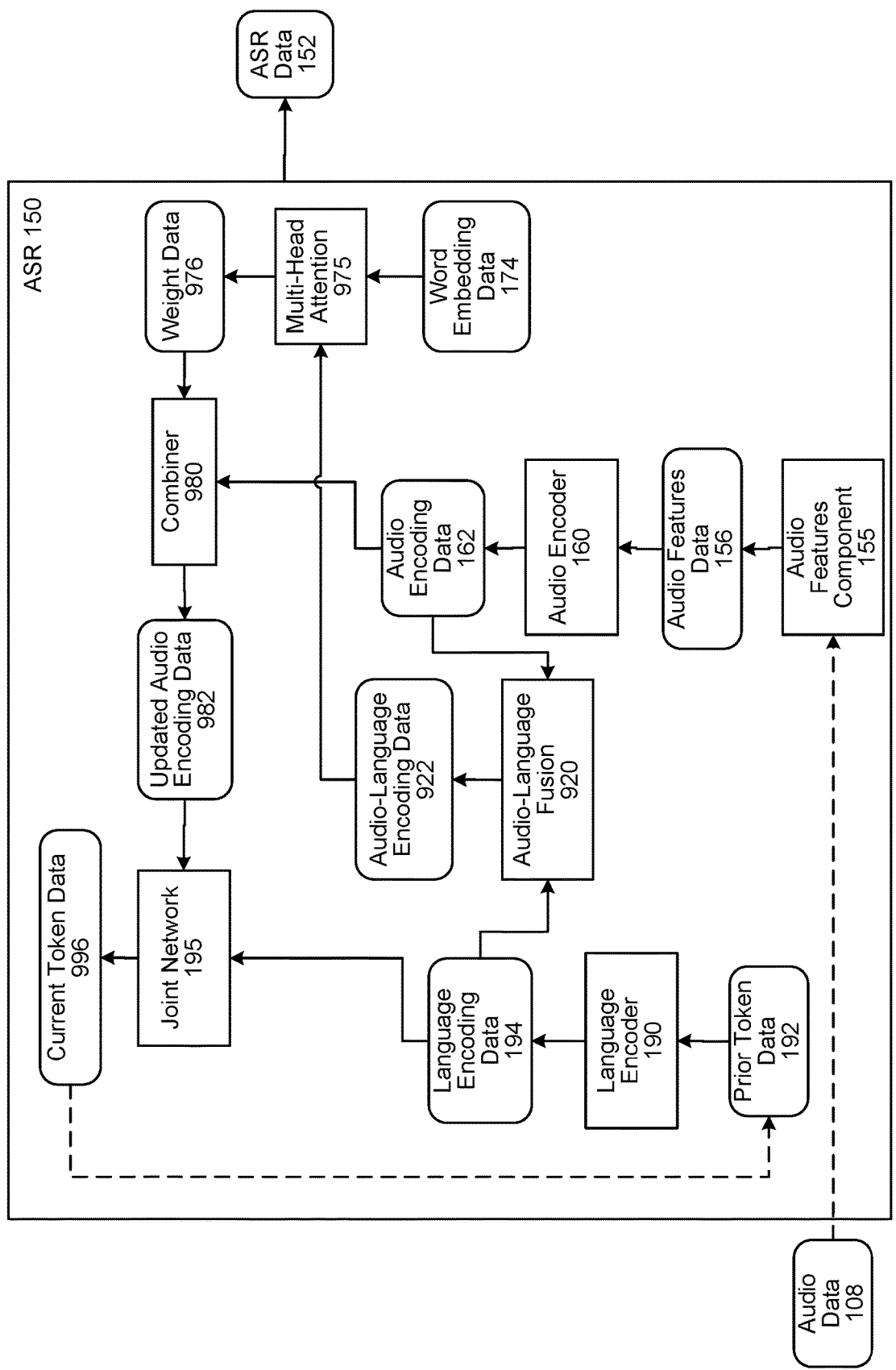
FIG. 9 is a conceptual diagram illustrating another example configuration of an ASR component that combines the language encoder output and the audio encoder output before using the context data from the user profile, according to embodiments of the present disclosure.

FIG. 9 illustrates another example embodiment of the ASR component 150, which involves integrating contextual information based on fused outputs of the language encoder and the audio encoder (e.g., an early fusion technique). The language encoder 190, the audio features component 155 and the audio encoder 160 may function in a similar manner as described above. In this example embodiment, an audio-language fusion component 920 may combine the language encoding data 194 (outputted by the language encoder 190) and the audio encoding data 162 (outputted by the audio encoder 160) to determine audio-language encoding data 922. The audio-language fusion component 920 may employ one or more machine learning techniques to perform the foregoing combination. For example, the audio-language fusion component 920 may use of one or more neural layers to project and/or resize the dimension of the language encoding data 194 and/or the audio encoding data 162. In some embodiments, the audio-language fusion component 920 may concatenate the language encoding data 194 and the audio encoding data 162.

A multi-head attention component 975 may process the word embedding data 174 and the audio-language encoding data 922 to determine weight data 976. The multi-head attention component 975 may be configured to determine a relationship (e.g., a similarity) between the word embedding data 174 and the audio-language encoding data 922. In determining the relationship, the multi-head attention component 975 may determine whether one or more words from the user profile data, represented in the word embedding data 174, are represented in a portion of the spoken input corresponding to the audio-language encoding data 922.

The weight data 976 may be a vector or matrix of weight values, where each weight value may correspond to a portion of the audio-language encoding data 922. The weight value may generally indicate whether the corresponding portion of the audio-language encoding data 922 is similar to a portion of the word embedding data 174, thus, indicating whether an audio frame and token (corresponding to the portion of the audio-language encoding data 922) represents a word(s) from the user profile data. The weight value may be 1 or 0. In other cases, the weight value may be a number between 0 and 1 (or between another numerical range, such as, 0 and 100, etc.), and may indicate how similar the corresponding portion of the audio-language encoding data 922 is to a portion of the word embedding data 174, or may indicate a likelihood/probability of the corresponding portion of the audio-language encoding data 922 being similar to a portion of the word embedding data 174.

As shown in FIG. 9, a combiner component 980 may process the weight data 976 and the audio encoding data 162 to determine updated audio encoding data 982. In the example embodiment shown in FIG. 9, the combiner component 980 may integrate the contextual information, from the user profile data for the user 105, into the audio encoding data 162. The updated audio encoding data 982 may be the audio encoding data 162 with certain portions being weighted higher than other portions, where the higher weighted portions may correspond to one or more words from the user profile data. The combiner component 980 may be similar to the combiner component 180 described above in relation to FIG. 1.

As shown, the joint network 195 may process the updated audio encoding data 982 and the language encoding data 194 to determine current token data 996. The current token data 996 may include one or more tokens predicted by the joint network 195 as corresponding to the set of audio frames represented in the audio encoding data 162.

If the current token data 996 is not a blank symbol, then the ASR component 150 may update the prior token data 192 to include the current token data 996. For the next time step processing involving the next set of audio frames in the audio data 108, the language encoder 190 may use the updated prior token data for processing. After all the audio frames of the audio data 108 are processed, the ASR component 150 may determine the ASR data 152, in a similar manner as described above in relation to FIG. 1.

Figure 10:
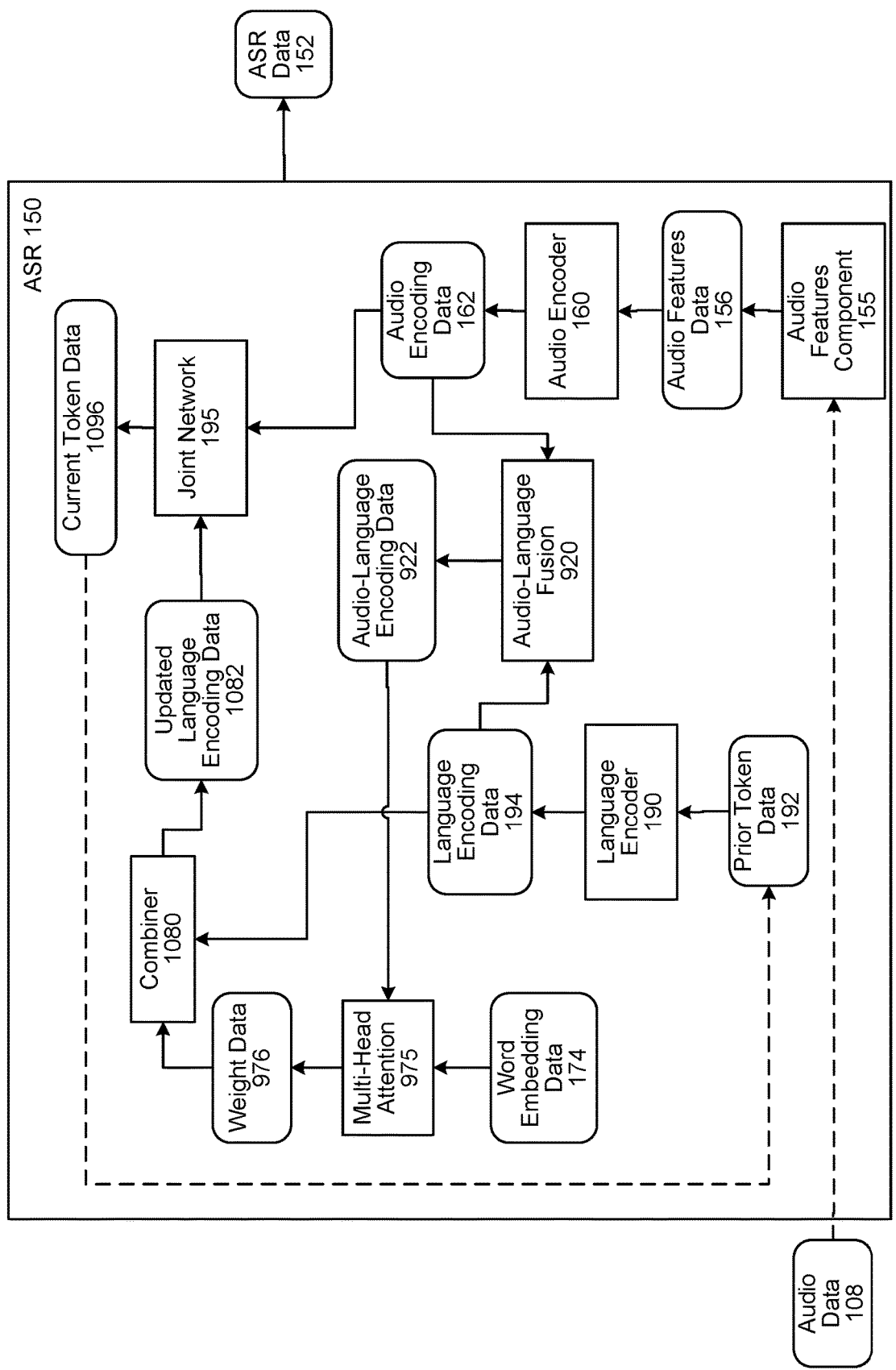
FIG. 10 is a conceptual diagram illustrating another example configuration of an ASR component that combines the language encoder output and the audio encoder output before using the context data from the user profile, according to embodiments of the present disclosure.

FIG. 10 illustrates an example embodiment of the ASR component 150, which involves integrating contextual information based on fused outputs of the language encoder and the audio encoder (e.g., an early fusion technique). As compared to the example embodiment of FIG. 9, this example embodiment of FIG. 10 involves integrating the contextual information into the output of the language encoder. The language encoder 190, the audio features component 155, the audio encoder 160, the audio-language fusion component 920, and the multi-head attention component 975 may function in a similar manner as described above.

As shown in FIG. 10, a combiner component 1080 may process the weight data 976 and the language encoding data 194 to determine updated language encoding data 1082. In the example embodiment shown in FIG. 10, the combiner component 1080 may integrate the contextual information, from the user profile data for the user 105, into the language encoding data 194. The updated language encoding data 1082 may be the language encoding data 194 with certain portions being weighted higher than other portions, where the higher weighted portions may correspond to one or more words from the user profile data. The combiner component 1080 may be similar to the combiner component 780 described above in relation to FIG. 7.

As shown, the joint network 195 may process the updated language encoding data 1082 and the audio encoding data 162 to determine current token data 1096. The current token data 1096 may include one or more tokens predicted by the joint network 195 as corresponding to the set of audio frames represented in the audio encoding data 162.

If the current token data 1096 is not a blank symbol, then the ASR component 150 may update the prior token data 192 to include the current token data 1096. For the next time step processing involving the next set of audio frames in the audio data 108, the language encoder 190 may use the updated prior token data for processing. After all the audio frames of the audio data 108 are processed, the ASR component 150 may determine the ASR data 152, in a similar manner as described above in relation to FIG. 1.

Although FIGS. 1, 7, 8, 9 and 10 show certain components as being the same, for example, at least the language encoder 190, the audio encoder 160 and the joint network 195, it should be understood that different components may be implemented in the different example embodiments. The function of these components may be similar, but the outputs may vary based on how the components are trained for the different example embodiments. For example, at least the language encoder 190, the audio encoder 160 and the joint network 195 in the example configuration shown in FIG. 1 may be trained jointly and optimized jointly, resulting in a first set of learnable parameters (e.g., layer weights, biases, etc.) for the language encoder 190, the audio encoder 160 and the joint network 195. As a further example, at least the language encoder 190, the audio encoder 160 and the joint network 195 in the example configuration shown in FIG. 7 may be trained jointly and optimized jointly, resulting in a second set of learnable parameters (e.g., layer weights, biases, etc.) for the language encoder 190, the audio encoder 160 and the joint network 195. The first set of learnable parameters may be different than the second set of learnable parameters based at least on a difference in the configuration of the components in the ASR component 150.

Figure 11:
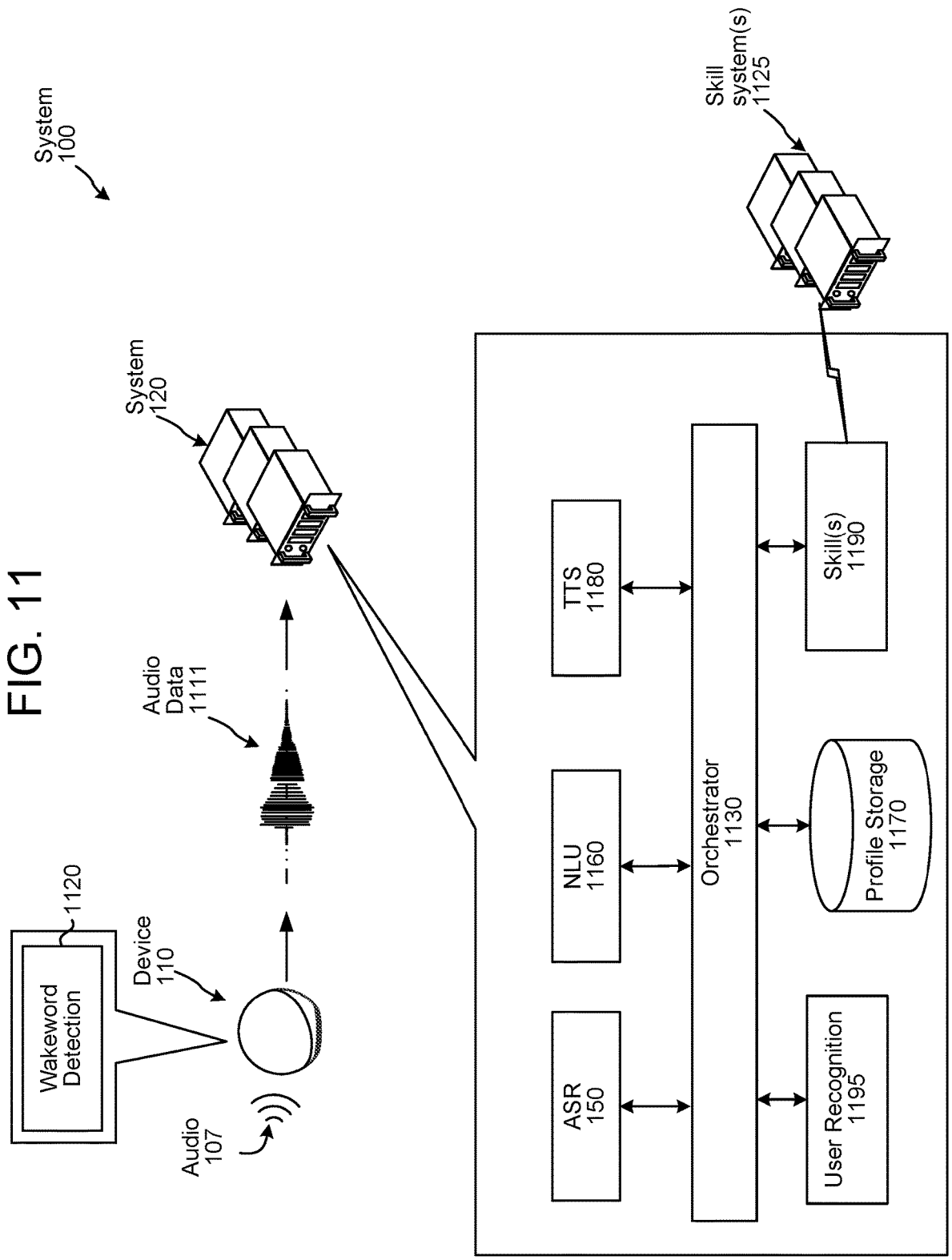
FIG. 11 is a conceptual diagram of components of the system, according to embodiments of the present disclosure.

The system 100 may operate using various components as illustrated in FIG. 11. The various components may be located on a same or different physical devices. Communication between various components may occur directly or across a network(s) 199.

A microphone or array of microphones (of or otherwise associated with the device 110) may capture audio. The device 110 processes audio data, representing the audio 107, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 1120. The wakeword detection component 1120 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 1120 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 1120 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 1120 detects a wakeword, the device 110 may "wake" and begin transmitting audio data 1111, representing the audio 107, to the system 120. The audio data 1111 may include the detected wakeword, or the device 110 may remove the portion of the audio data, corresponding to the detected wakeword, prior to sending the audio data 1111 to the system 120.

The system 120 may include an orchestrator component 1130 configured to, among other things, coordinate data transmissions between components of the system 120. The orchestrator component 1130 may receive the audio data 1111 from the device 110, and send the audio data 1111 to an ASR component 150.

The ASR component 150 transcribes the audio data 1111 into ASR data including one or more ASR hypotheses. An ASR hypothesis may be configured as a textual interpretation of the speech in the audio data 1111, or may be configured in another manner, such as one or more tokens. Each ASR hypothesis may represent a different likely interpretation of the speech in the audio data 1111. Each ASR hypothesis may be associated with a score (e.g., confidence score, probability score, or the like) representing the associated ASR hypothesis correctly represents the speech in the audio data 1111.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 1130. The orchestrator component 1130 may send the text data or ASR data, depending on the type of natural language input received, to a NLU component 1160.

The NLU component 1160 processes the ASR data or text data to determine one or more NLU hypotheses embodied in NLU output data. The NLU component 1160 may perform intent classification (IC) processing on the ASR output data or text data to determine an intent of the natural language input. An intent corresponds to an action to be performed that is responsive to the natural language input. To perform IC processing, the NLU component 1160 may communicate with a database of words linked to intents. For example, a music intent database may link words and phrases such as "quiet," "volume off," and "mute" to a <Mute> intent. The NLU component 1160 identifies intents by comparing words and phrases in ASR output data or text data to the words and phrases in an intents database. In some embodiments, the NLU component 1160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 1160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 1160 may be linked to one or more grammar frameworks with entity types to be populated with entity values. Each entity type of a grammar framework corresponds to a portion of ASR output data or text data that the NLU component 1160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 1160 may perform NER processing to identify words in ASR output data or text data as subject, object, verb, preposition, etc. based on grammar rules and/or models. Then, the NLU component 1160 may perform IC processing using the identified verb to identify an intent. Thereafter, the NLU component 1160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 1160 may generate NLU output data including one or more NLU hypotheses, with each NLU hypothesis including an intent and optionally one or more entity types and corresponding entity values. In some embodiments, the NLU component 1160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 1160). In at least some embodiments, the system 120 may implement a spoken language understanding (SLU) component configured to process audio data 1111 to determine NLU output data.

The SLU component may be equivalent to a combination of the ASR component 150 and the NLU component 1160. Yet, the SLU component may process audio data 1111 and directly determine the NLU output data, without an intermediate step of generating ASR output data. As such, the SLU component may take audio data 1111 representing a spoken natural language input and attempt to make a semantic interpretation of the spoken natural language input. That is, the SLU component may determine a meaning associated with the spoken natural language input and then implement that meaning. For example, the SLU component may interpret audio data 1111 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 1190 and/or may communicate with one or more skill systems 1125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 1190 may operate in conjunction between the system 120 and other devices, such as the device 110, a restaurant electronic ordering system, a taxi electronic booking system, etc. in order to complete certain functions. Inputs to a skill 1190 may come from speech processing interactions or through other interactions or input sources.

A skill 1190 may be associated with a domain, a non-limiting list of which includes a smart home domain, a music domain, a video domain, a weather domain, a communications domain, a flash briefing domain, a shopping domain, and a custom domain.

The system 120 may include a TTS component 1180 that generates audio data including synthesized speech. The data input to the TTS component 1180 may come from a skill system 1125, the orchestrator component 1130, or another component of the system 120.

In one method of synthesis called unit selection, the TTS component 1180 matches input data against a database of recorded speech. The TTS component 1180 selects matching units of recorded speech and concatenates the units together to form audio data. In another method of synthesis called parametric synthesis, the TTS component 1180 varies parameters such as frequency, volume, and noise to determine audio data including an artificial speech waveform. Parametric synthesis uses a computerized voice generator, sometimes called a vocoder.

The system 120 may include a user recognition component 1195. The user recognition component 1195 may recognize one or more users using various data. The user recognition component 1195 may take as input the audio data 1111. The user recognition component 1195 may perform user recognition by comparing speech characteristics, in the audio data 1111, to stored speech characteristics of users. The user recognition component 1195 may additionally or alternatively perform user recognition by comparing biometric data (e.g., fingerprint data, iris data, retina data, etc.), received by the system 120 in correlation with a natural language input, to stored biometric data of users. The user recognition component 1195 may additionally or alternatively perform user recognition by comparing image data (e.g., including a representation of at least a feature of a user), received by the system 120 in correlation with a natural language input, with stored image data including representations of features of different users. The user recognition component 1195 may perform other or additional user recognition processes, including those known in the art. For a particular natural language input, the user recognition component 1195 may perform processing with respect to stored data of users associated with the device 110 that received the natural language input.

The user recognition component 1195 determines whether a natural language input originated from a particular user. For example, the user recognition component 1195 may determine a first value representing a likelihood that a natural language input originated from a first user, a second value representing a likelihood that the natural language input originated from a second user, etc. The user recognition component 1195 may also determine an overall confidence regarding the accuracy of user recognition processing.

The user recognition component 1195 may output a single user identifier corresponding to the most likely user that originated the natural language input. Alternatively, the user recognition component 1195 may output multiple user identifiers (e.g., in the form of an N-best list) with respective values representing likelihoods of respective users originating the natural language input. The output of the user recognition component 1195 may be used to inform NLU processing, processing performed by a skill system 1125, as well as processing performed by other components of the system 120 and/or other systems.

The system 120 may include profile storage 1170. The profile storage 1170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 1170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skill systems 1125 that the user has enabled. When a user enables a skill system 1125, the user is providing the system 120 with permission to allow the skill system 1125 to execute with respect to the user's natural language inputs. If a user does not enable a skill system 1125, the system 120 may not execute the skill system 1125 with respect to the user's natural language inputs.

The profile storage 1170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 1170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 12:
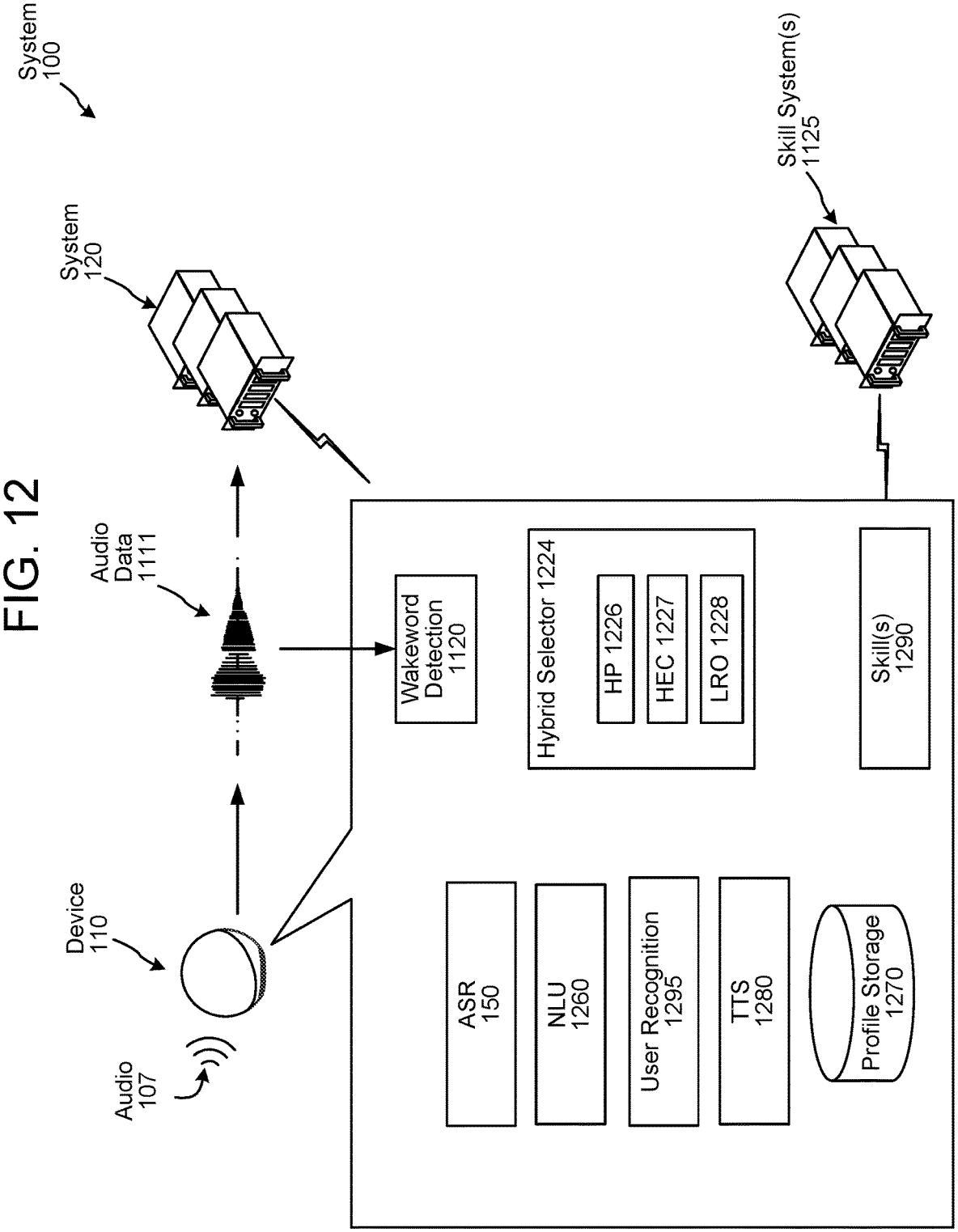
FIG. 12 is a conceptual diagram illustrating components that may be included in a device, according to embodiments of the present disclosure.

The foregoing describes illustrative components and processing of the system 120. The following describes illustrative components and processing of the device 110. As illustrated in FIG. 12, in at least some embodiments the system 120 may receive the audio data 1111 from the device 110, to recognize speech corresponding to a spoken natural language in the received audio data 1111, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 11, the device 110 may include a wakeword detection component 1120 configured to detect a wakeword (e.g., "Alexa") that indicates to the device 110 that the audio data 1111 is to be processed for determining NLU output data. In at least some embodiments, a hybrid selector 1224, of the device 110, may send the audio data 1111 to the wakeword detection component 1120. If the wakeword detection component 1120 detects a wakeword in the audio data 1111, the wakeword detection component 1120 may send an indication of such detection to the hybrid selector 1224. In response to receiving the indication, the hybrid selector 1224 may send the audio data 1111 to the system 120 and/or an on-device ASR component 150. The wakeword detection component 1120 may also send an indication, to the hybrid selector 1224, representing a wakeword was not detected. In response to receiving such an indication, the hybrid selector 1224 may refrain from sending the audio data 1111 to the system 120, and may prevent the on-device ASR component 150 from processing the audio data 1111. In this situation, the audio data 1111 can be discarded.

The device 110 may conduct its own speech processing using on-device language processing components (such as an on-device SLU component, an on-device ASR component 150, and/or a NLU component 1260 similar to the manner discussed above with respect to the NLU component 1160). The device 110 may also internally include, or otherwise have access to, other components such as one or more skill components 1290 (similar to the skill components 1190) one or more skill systems 1125, a user recognition component 1295 (configured to process in a similar manner to the user recognition component 1195), profile storage 1270 (configured to store similar profile data to the profile storage 1170), a TTS component 1280 (configured to process in a similar manner to the TTS component 1180), and other components. In at least some embodiments, the profile storage 1270 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 1224, of the device 110, may include a hybrid proxy (HP) 1226 configured to proxy traffic to/from the system 120. For example, the HP 1226 may be configured to send messages to/from a hybrid execution controller (HEC) 1227 of the hybrid selector 1224. For example, command/directive data received from the system 120 can be sent to the HEC 1227 using the HP 1226. The HP 1226 may also be configured to allow the audio data 1111 to pass to the system 120 while also receiving (e.g., intercepting) this audio data 1111 and sending the audio data 1111 to the HEC 1227.

In at least some embodiments, the hybrid selector 1224 may further include a local request orchestrator (LRO) 1228 configured to notify the on-device ASR component 150 about the availability of the audio data 1111, and to otherwise initiate the operations of on-device language processing when the audio data 1111 becomes available. In general, the hybrid selector 1224 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 1111 is received, the HP 1226 may allow the audio data 1111 to pass through to the system 120 and the HP 1226 may also input the audio data 1111 to the on-device ASR component 150 by routing the audio data 1111 through the HEC 1227 of the hybrid selector 1224, whereby the LRO 1228 notifies the on-device ASR component 150 of the audio data 1111. At this point, the hybrid selector 1224 may wait for response data from either or both the system 120 and/or the on-device language processing components. However, the disclosure is not limited thereto, and in some examples the hybrid selector 1224 may send the audio data 1111 only to the on-device ASR component 150 without departing from the disclosure. For example, the device 110 may process the audio data 1111 on-device without sending the audio data 1111 to the system 120.

The on-device ASR component 150 is configured to receive the audio data 1111 from the hybrid selector 1224, and to recognize speech in the audio data 1111, and the NLU component 1260 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the NLU component 1260) may be selected as usable to respond to a natural language input, and local response data may be sent (e.g., local NLU output data, local knowledge base information, internet search results, and/or local directive data) to the hybrid selector 1224, such as a "ReadyToExecute" response. The hybrid selector 1224 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 1111 to the system 120, and the response data from the system 120 may include the unique identifier to identify to which natural language input the response data corresponds.

In at least some embodiments, the device 110 may include one or more skill systems 1125 that may process similarly to the speech processing system-implemented skill(s) 1125. The skill(s) 1125 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 13:
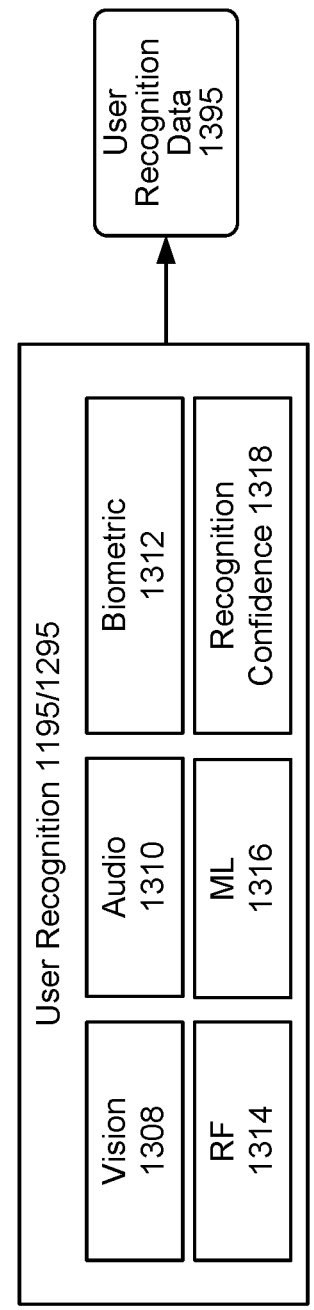
FIG. 13 is a schematic diagram of an illustrative architecture in which sensor data is combined to recognize one or more users according to embodiments of the present disclosure.

The system(s) 120 may include a user recognition component 1195/1295 that recognizes one or more users using a variety of data. As illustrated in FIG. 13, the user recognition component 1195/1295 may include one or more subcomponents including a vision component 1308, an audio component 1310, a biometric component 1312, a radio frequency (RF) component 1314, a machine learning (ML) component 1316, and a recognition confidence component 1318. In some instances, the user recognition component 1195/1295 may monitor data and determinations from one or more subcomponents to determine an identity of one or more users associated with data input to the system(s) 120. The user recognition component 1195/1295 may output user recognition data 1395, which may include a user identifier associated with a user the user recognition component 1195/1295 believes originated data input to the system(s) 120. The user recognition data 1395 may be used to inform processes performed by various components of the system(s) 120.

The vision component 1308 may receive data from one or more sensors capable of providing images (e.g., cameras) or sensors indicating motion (e.g., motion sensors). The vision component 1308 can perform facial recognition or image analysis to determine an identity of a user and to associate that identity with a user profile associated with the user. In some instances, when a user is facing a camera, the vision component 1308 may perform facial recognition and identify the user with a high degree of confidence. In other instances, the vision component 1308 may have a low degree of confidence of an identity of a user, and the user recognition component 1195/1295 may utilize determinations from additional components to determine an identity of a user. The vision component 1308 can be used in conjunction with other components to determine an identity of a user. For example, the user recognition component 1195/1295 may use data from the vision component 1308 with data from the audio component 1310 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 1312. For example, the biometric component 1312 may receive data corresponding to fingerprints, iris or retina scans, thermal scans, weights of users, a size of a user, pressure (e.g., within floor sensors), etc., and may determine a biometric profile corresponding to a user. The biometric component 1312 may distinguish between a user and sound from a television, for example. Thus, the biometric component 1312 may incorporate biometric information into a confidence level for determining an identity of a user. Biometric information output by the biometric component 1312 can be associated with specific user profile data such that the biometric information uniquely identifies a user profile of a user.

The RF component 1314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1314 the strength of the signal (e.g., as a received signal strength indication (RSSI)). The RF component 1314 may use the RSSI to determine an identity of a user (with an associated confidence level). In some instances, the RF component 1314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 1316 may track the behavior of various users as a factor in determining a confidence level of the identity of the user. By way of example, a user may adhere to a regular schedule such that the user is at a first location during the day (e.g., at work or at school). In this example, the ML component 1316 would factor in past behavior and/or trends in determining the identity of the user that provided input to the system(s) 120. Thus, the ML component 1316 may use historical data and/or usage patterns over time to increase or decrease a confidence level of an identity of a user.

In at least some instances, the recognition confidence component 1318 receives determinations from the various components 1308, 1310, 1312, 1314, and 1316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1395.

The audio component 1310 may receive data from one or more sensors capable of providing an audio signal (e.g., one or more microphones) to facilitate recognition of a user. The audio component 1310 may perform audio recognition on an audio signal to determine an identity of the user and associated user identifier. In some instances, aspects of the system(s) 120 may be configured at a computing device (e.g., a local server). Thus, in some instances, the audio component 1310 operating on a computing device may analyze all sound to facilitate recognition of a user. In some instances, the audio component 1310 may perform voice recognition to determine an identity of a user.

The audio component 1310 may also perform user identification based on audio data 1111 input into the system(s) 120 for speech processing. The audio component 1310 may determine scores indicating whether speech in the audio data 1111 originated from particular users. For example, a first score may indicate a likelihood that speech in the audio data 1111 originated from a first user associated with a first user identifier, a second score may indicate a likelihood that speech in the audio data 1111 originated from a second user associated with a second user identifier, etc. The audio component 1310 may perform user recognition by comparing speech characteristics represented in the audio data 1111 to stored speech characteristics of users (e.g., stored voice profiles associated with the device 110 that captured the spoken user input).

Figure 14:
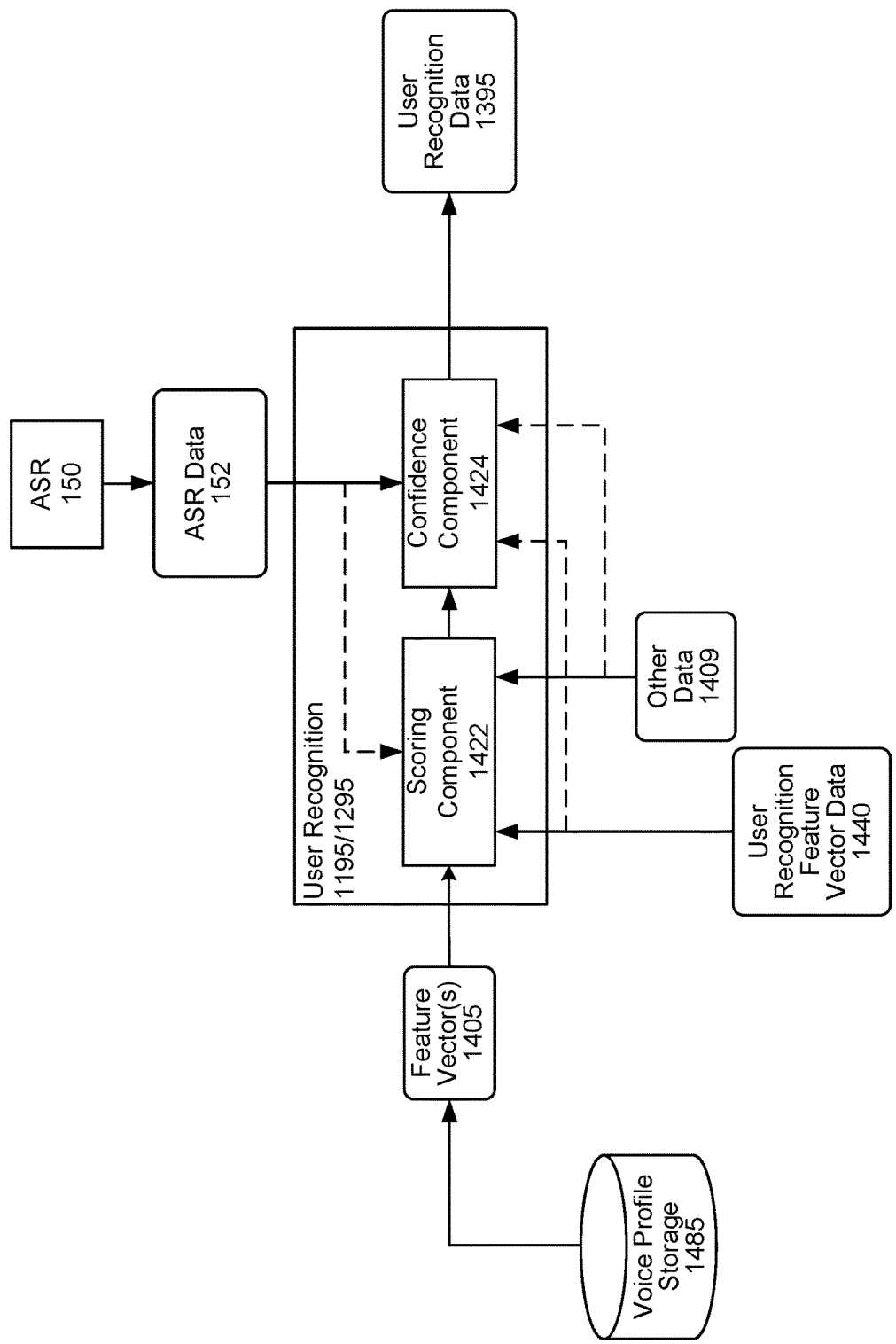
FIG. 14 is a system flow diagram illustrating user recognition according to embodiments of the present disclosure.

FIG. 14 illustrates user recognition processing as may be performed by the user recognition component 1195/1295. The ASR data 152, determined by the ASR component 150 and including one or more confidence scores, may be passed to the user recognition component 1195/1295.

The user recognition component 1195/1295 performs user recognition using various data including the user recognition feature vector data 1440, feature vectors 1405 representing voice profiles of users of the system(s) 120, the ASR data 152, and other data 1409. The user recognition component 1195/1295 may output the user recognition data 1395, which reflects a certain confidence that the user input was spoken by one or more particular users. The user recognition data 1395 may include one or more user identifiers (e.g., corresponding to one or more voice profiles). Each user identifier in the user recognition data 1395 may be associated with a respective confidence value, representing a likelihood that the user input corresponds to the user identifier. A confidence value may be a numeric or binned value.

The feature vector(s) 1405 input to the user recognition component 1195/1295 may correspond to one or more voice profiles. The user recognition component 1195/1295 may use the feature vector(s) 1405 to compare against the user recognition feature vector 1440, representing the present user input, to determine whether the user recognition feature vector 1440 corresponds to one or more of the feature vectors 1405 of the voice profiles. Each feature vector 1405 may be the same size as the user recognition feature vector 1440.

To perform user recognition, the user recognition component 1195/1295 may determine the device 110 from which the audio data 1111 originated. For example, the audio data 1111 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata. The system(s) 120 may associate the metadata with the user recognition feature vector 1440 produced from the audio data 1111. The user recognition component 1195/1295 may send a signal to voice profile storage 1485, with the signal requesting only audio data and/or feature vectors 1405 (depending on whether audio data and/or corresponding feature vectors are stored) associated with the device identifier, the group profile identifier, and/or the user identifiers represented in the metadata. This limits the universe of possible feature vectors 1405 the user recognition component 1195/1295 considers at runtime and thus decreases the amount of time to perform user recognition processing by decreasing the amount of feature vectors 1405 needed to be processed. Alternatively, the user recognition component 1195/1295 may access all (or some other subset of) the audio data and/or feature vectors 1405 available to the user recognition component 1195/1295. However, accessing all audio data and/or feature vectors 1405 will likely increase the amount of time needed to perform user recognition processing based on the magnitude of audio data and/or feature vectors 1405 to be processed.

If the user recognition component 1195/1295 receives audio data from the voice profile storage 1485, the user recognition component 1195/1295 may generate one or more feature vectors 1405 corresponding to the received audio data.

The user recognition component 1195/1295 may attempt to identify the user that spoke the speech represented in the audio data 1111 by comparing the user recognition feature vector 1440 to the feature vector(s) 1405. The user recognition component 1195/1295 may include a scoring component 1422 that determines respective scores indicating whether the user input (represented by the user recognition feature vector 1440) was spoken by one or more particular users (represented by the feature vector(s) 1405). The user recognition component 1195/1295 may also include a confidence component 1424 that determines an overall accuracy of user recognition processing (such as those of the scoring component 1422) and/or an individual confidence value with respect to each user potentially identified by the scoring component 1422. The output from the scoring component 1422 may include a different confidence value for each received feature vector 1405. For example, the output may include a first confidence value for a first feature vector 1405a (representing a first voice profile), a second confidence value for a second feature vector 1405b (representing a second voice profile), etc. Although illustrated as two separate components, the scoring component 1422 and the confidence component 1424 may be combined into a single component or may be separated into more than two components.

The scoring component 1422 and the confidence component 1424 may implement one or more trained machine learning models (such as neural networks, classifiers, etc.) as known in the art. For example, the scoring component 1422 may use probabilistic linear discriminant analysis (PLDA) techniques. PLDA scoring determines how likely it is that the user recognition feature vector 1440 corresponds to a particular feature vector 1405. The PLDA scoring may generate a confidence value for each feature vector 1405 considered and may output a list of confidence values associated with respective user identifiers. The scoring component 1422 may also use other techniques, such as GMMs, generative Bayesian models, or the like, to determine confidence values.

The confidence component 1424 may input various data including information about the ASR data 152, speech length (e.g., number of frames or other measured length of the user input), audio condition/quality data (such as signal-to-interference data or other metric data), fingerprint data, image data, or other factors to consider how confident the user recognition component 1195/1295 is with regard to the confidence values linking users to the user input. The confidence component 1424 may also consider the confidence values and associated identifiers output by the scoring component 1422. For example, the confidence component 1424 may determine that a lower confidence score ASR data 152, or poor audio quality, or other factors, may result in a lower confidence of the user recognition component 1195/1295. Whereas a higher confidence score ASR data 152, or better audio quality, or other factors, may result in a higher confidence of the user recognition component 1195/1295. Precise determination of the confidence may depend on configuration and training of the confidence component 1424 and the model(s) implemented thereby. The confidence component 1424 may operate using a number of different machine learning models/techniques such as GMM, neural networks, etc. For example, the confidence component 1424 may be a classifier configured to map a score output by the scoring component 1422 to a confidence value.

The user recognition component 1195/1295 may output user recognition data 1395 specific to a one or more user identifiers. For example, the user recognition component 1195/1295 may output user recognition data 1395 with respect to each received feature vector 1405. The user recognition data 1395 may include numeric confidence values (e.g., 0.0-1.0, 0-1000, or whatever scale the system is configured to operate). Thus, the user recognition data 1395 may output an n-best list of potential users with numeric confidence values (e.g., user identifier 123—0.2, user identifier 234—0.8). Alternatively or in addition, the user recognition data 1395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 1195/1295 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1395 may only include information related to the top scoring identifier as determined by the user recognition component 1195/1295.

The user recognition component 1195/1295 may also output an overall confidence value that the individual confidence values are correct, where the overall confidence value indicates how confident the user recognition component 1195/1295 is in the output results. The confidence component 1424 may determine the overall confidence value.

The confidence component 1424 may determine differences between individual confidence values when determining the user recognition data 1395. For example, if a difference between a first confidence value and a second confidence value is large, and the first confidence value is above a threshold confidence value, then the user recognition component 1195/1295 is able to recognize a first user (associated with the feature vector 1405 associated with the first confidence value) as the user that spoke the user input with a higher confidence than if the difference between the confidence values were smaller.

The user recognition component 1195/1295 may perform thresholding to avoid incorrect user recognition data 1395 being output. For example, the user recognition component 1195/1295 may compare a confidence value output by the confidence component 1424 to a threshold confidence value. If the confidence value does not satisfy (e.g., does not meet or exceed) the threshold confidence value, the user recognition component 1195/1295 may not output user recognition data 1395, or may only include in that data 1395 an indicator that a user that spoke the user input could not be recognized. Further, the user recognition component 1195/1295 may not output user recognition data 1395 until enough user recognition feature vector data 1440 is accumulated and processed to verify a user above a threshold confidence value. Thus, the user recognition component 1195/1295 may wait until a sufficient threshold quantity of audio data of the user input has been processed before outputting user recognition data 1395. The quantity of received audio data may also be considered by the confidence component 1424.

The user recognition component 1195/1295 may be defaulted to output binned (e.g., low, medium, high) user recognition confidence values. However, such may be problematic in certain situations. For example, if the user recognition component 1195/1295 computes a single binned confidence value for multiple feature vectors 1405, the system may not be able to determine which particular user originated the user input. In this situation, the user recognition component 1195/1295 may override its default setting and output numeric confidence values. This enables the system to determine a user, associated with the highest numeric confidence value, originated the user input.

The user recognition component 1195/1295 may use other data 1409 to inform user recognition processing. A trained model(s) or other component of the user recognition component 1195/1295 may be trained to take other data 1409 as an input feature when performing user recognition processing. Other data 1409 may include a variety of data types depending on system configuration and may be made available from other sensors, devices, or storage. The other data 1409 may include a time of day at which the audio data 1111 was generated by the device 110 or received from the device 110, a day of a week in which the audio data 1111 was generated by the device 110 or received from the device 110, etc.

The other data 1409 may include image data or video data. For example, facial recognition may be performed on image data or video data received from the device 110 from which the audio data 1111 was received (or another device). Facial recognition may be performed by the user recognition component 1195/1295. The output of facial recognition processing may be used by the user recognition component 1195/1295. That is, facial recognition output data may be used in conjunction with the comparison of the user recognition feature vector 1440 and one or more feature vectors 1405 to perform more accurate user recognition processing.

The other data 1409 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1409 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 1111 was received is a smart watch or vehicle belonging to a user A, the fact that the device 110 belongs to user A may increase a user recognition confidence value associated with user A and/or decrease a user recognition confidence value associated with user B.

The other data 1409 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 1111. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1409 may include data representing activity of a particular user that may be useful in performing user recognition processing. For example, a user may have recently entered a code to disable a home security alarm. A device 110, represented in a group profile associated with the home, may have generated the audio data 1111. The other data 1409 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 1409 and considered by the user recognition component 1195/1295.

Depending on system configuration, the other data 1409 may be configured to be included in the user recognition feature vector data 1440 so that all the data relating to the user input to be processed by the scoring component 1422 may be included in a single feature vector. Alternatively, the other data 1409 may be reflected in one or more different data structures to be processed by the scoring component 1422.

Figure 15:
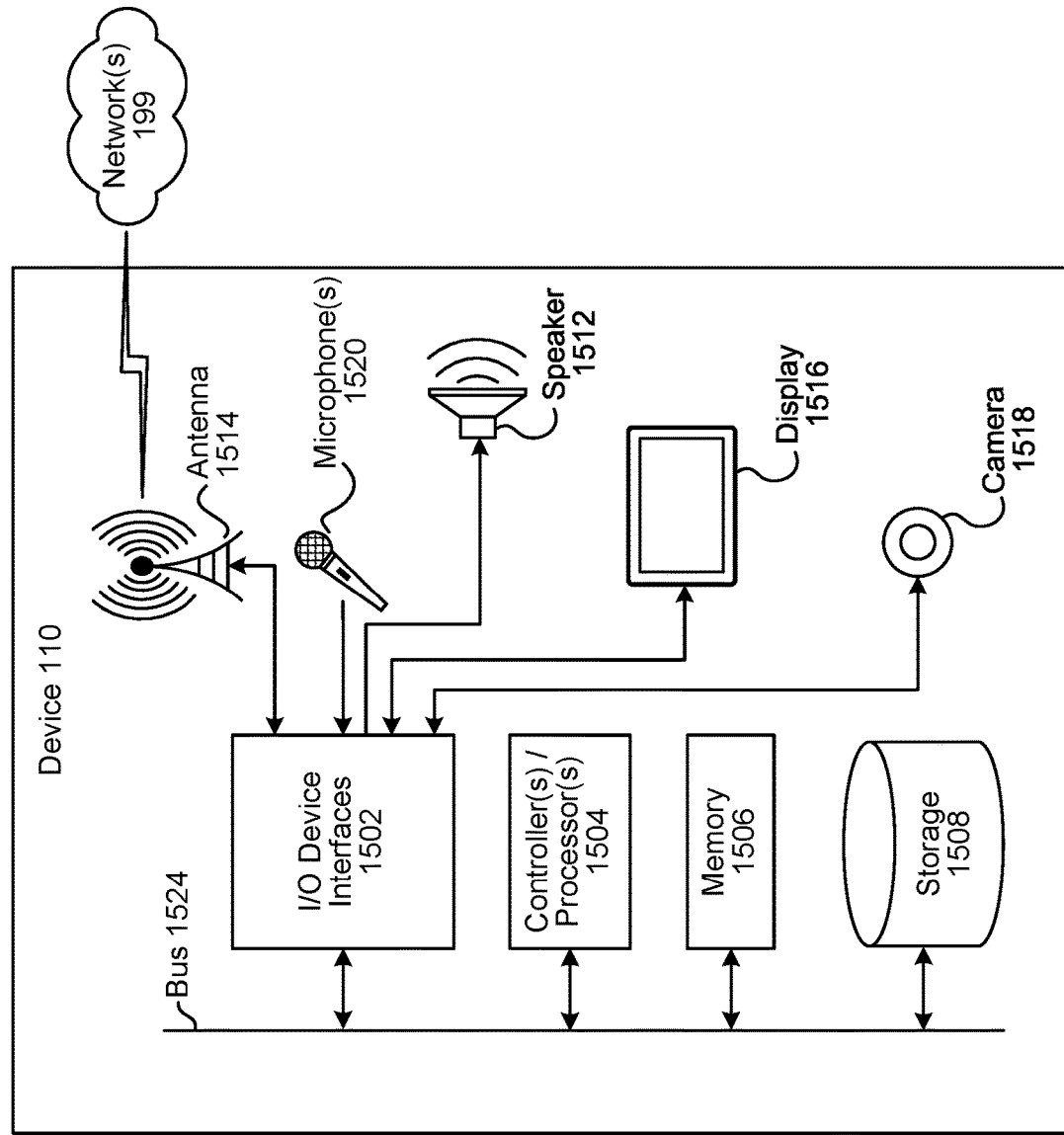
FIG. 15 is a block diagram conceptually illustrating example components of a device, according to embodiments of the present disclosure.
Figure 16:
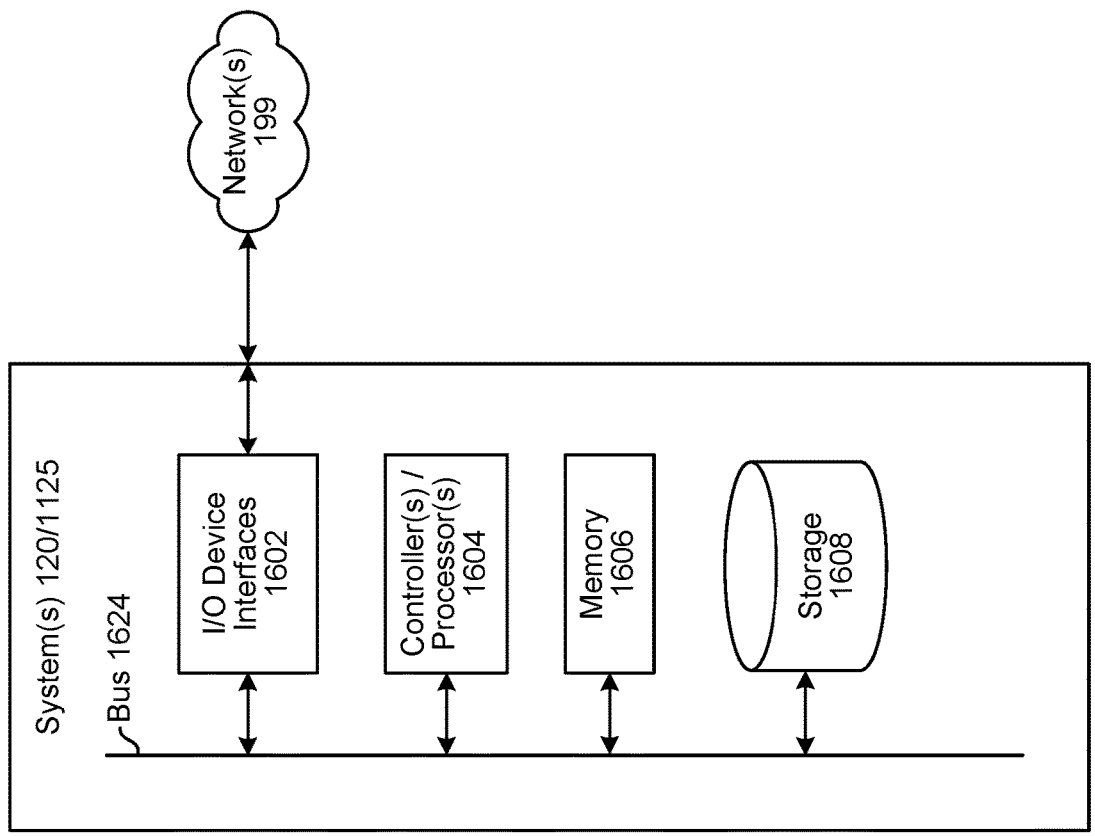
FIG. 16 is a block diagram conceptually illustrating example components of a system, according to embodiments of the present disclosure.

FIG. 15 is a block diagram conceptually illustrating a device 110 of the system 100. FIG. 16 is a block diagram conceptually illustrating example components of a system, such as the system 120, and the skill(s) system 1125. A system (120/1125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/1125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/1125) may be included in the system 100 of the present disclosure, such as, one or more systems 120 and/or one or more skill systems 1125. In operation, each of these systems may include computer-readable and computer-executable instructions that reside on the respective device (120/1125), as will be discussed further below.

Each of these devices (110/120/1125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/1125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/1125) may also be connected to removable or external non-volatile memory and/or storage (such as a removable memory card, memory key drive, networked storage, etc.) through respective input/output device interfaces (1502/1602).

Computer instructions for operating each device (110/120/1125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/1125) includes input/output device interfaces (1502/1602). A variety of components may be connected through the input/output device interfaces (1502/1602), as will be discussed further below. Additionally, each device (110/120/1125) may include an address/data bus (1524/1624) for conveying data among components of the respective device. Each component within a device (110/120/1125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device 110, the system 120, and/or skill system 1125 may include their own dedicated processors, memory, and/or storage. Alternatively, one or more of the components of the device 110, the system 120, and/or skill system 1125 may utilize the I/O interfaces (1502/1602), processor(s) (1504/1604), memory (1506/1606), and/or storage (1508/1608) of the device 110, the system 120, and/or skill system 1125, respectively.

As noted above, multiple devices may be employed in a single system. In such a multi-device system, each of the devices may include different components for performing different aspects of the system's processing. The multiple devices may include overlapping components. The components of the device 110, the system 120, and the skill system 1125, as described herein, are illustrative, and may be located as a stand-alone device or may be included, in whole or in part, as a component of a larger device or system.

Figure 17:
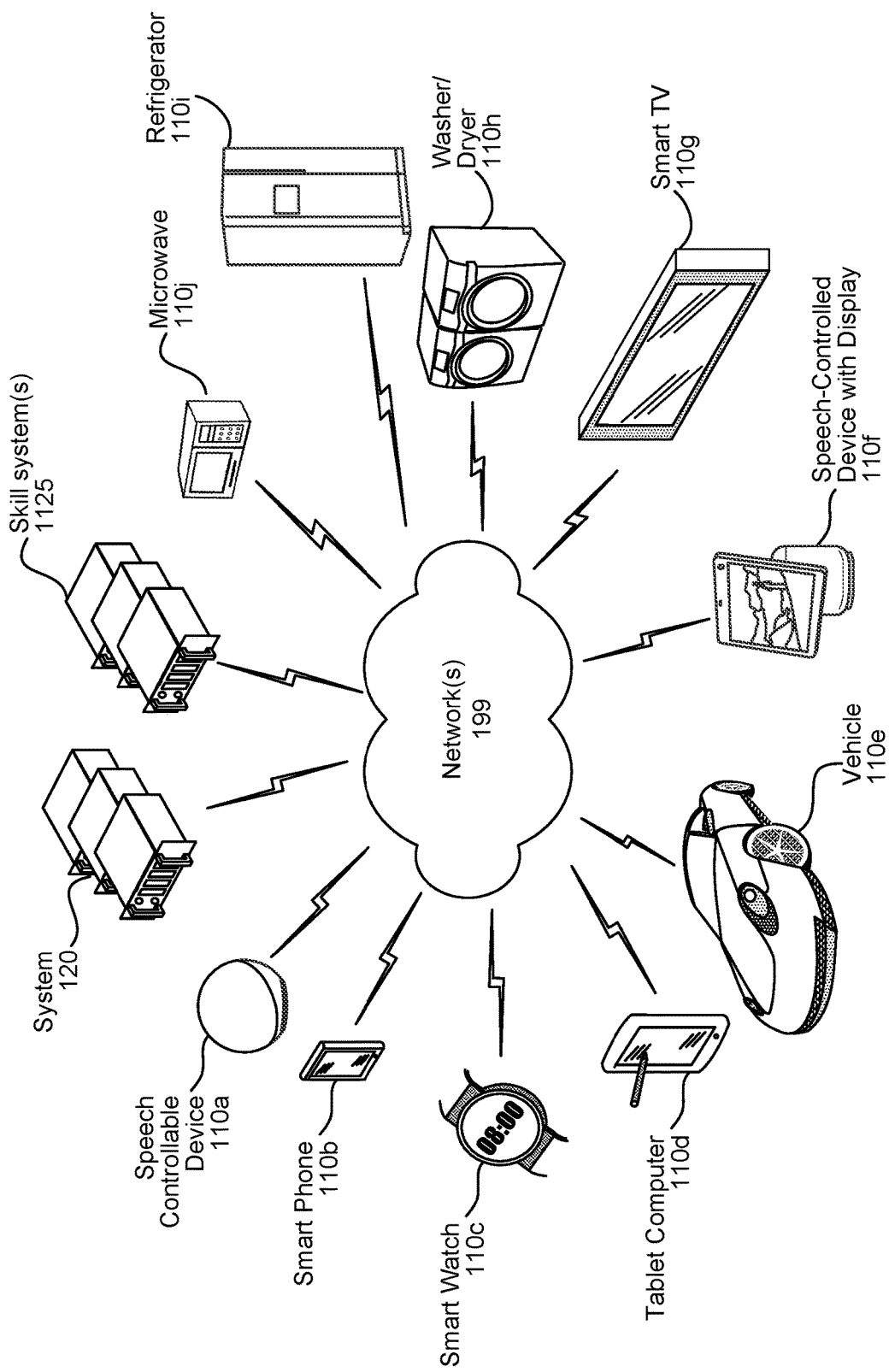
FIG. 17 illustrates an example of a computer network for use with the overall system, according to embodiments of the present disclosure.

As illustrated in FIG. 17, multiple devices (110a-110j, 120, 1125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill system 1125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for automatic speech recognition (ASR) processing, the computer-implemented method comprising:

receiving audio data corresponding to a spoken input;
determining, using the audio data, a plurality of audio frames including an audio frame, the audio frame comprising a portion of the audio data;
determining, using a first set of audio frames of the plurality of audio frames, first audio feature data corresponding to a frequency domain representation of the first set of audio frames;
processing, using an audio encoder, the first audio feature data to determine first audio encoding data corresponding to a latent representation of features corresponding to the first set of audio frames;
determining user profile data corresponding to the spoken input;
determining, using a portion of the user profile data, first word embedding data corresponding to a vector representation of the portion of the user profile data;
processing, using a first multi-head attention component, the first audio encoding data and the first word embedding data to determine first weight data, the first multi-head attention component configured to determine a similarity between audio features and word embeddings, the first weight data being based on at least the portion of the user profile data being represented in the first audio encoding data;
determining, using the first audio encoding data and the first weight data, updated first audio encoding data;
determining first language encoding data using a language encoder and first language data, the first language data corresponding to at least a second set of audio frames, of the plurality of audio frames, occurring prior to the first set of audio frames, the first language data including at least a first token corresponding to at least a first subword represented in the second set of audio frames; and
processing, using a joint network, the updated first audio encoding data and the first language encoding data to determine second language data including a second token corresponding to a second subword represented in the first set of audio frames.

2. The computer-implemented method of claim 1, further comprising:
determining, using a third set of audio frames from the plurality of audio frames, second audio feature data;
processing, using the audio encoder, the second audio feature data to determine second audio encoding data corresponding to the third set of audio frames;
processing, using the first multi-head attention component, the second audio encoding data and the first word embedding data to determine second weight data, the second weight data being based on at least the portion of the user profile data being represented in the second audio encoding data;
determining, using the second audio encoding data and the second weight data, updated second audio encoding data;
determining second language encoding data using the language encoder, the first language data, and the second language data;
processing, using the joint network, the updated second audio encoding data and the second language encoding data to determine a third token corresponding to a third subword represented in the third set of audio frames; and
determining ASR data corresponding to the audio data, the ASR data sequentially including at least the first token, the second token and the third token, the ASR data including a representation of the portion of the user profile data.

3. The computer-implemented method of claim 1, further comprising:
processing, using a second multi-head attention component, the first language encoding data and the first word embedding data to determine second weight data, the second multi-head attention component configured to determine a similarity between language features and word embeddings, the second weight data being based on at least the portion of the user profile data being represented in the first language encoding data; and
determining, using the first language encoding data and the second weight data, updated first language encoding data,
wherein processing using the joint network comprises processing the updated first audio encoding data and the updated first language encoding data to determine the second language data.

4. A computer-implemented method comprising:
receiving audio data corresponding to a spoken input;
determining user profile data corresponding to the audio data;
determining first word embedding data using at least a first word included in the user profile data;
determining first audio encoding data corresponding to at least a first portion of the audio data;
determining second audio encoding data using the first word embedding data, the first audio encoding data, and weight data representing a similarity between the first word embedding data and the first audio encoding data;
determining first language encoding data corresponding to at least a first token, wherein the first token is based on a second portion of the audio data occurring prior to the first portion of audio data; and
determining, using the second audio encoding data and the first language encoding data, a second token corresponding to the first portion of audio data.

5. The computer-implemented method of claim 4, further comprising:
determining that the first word represents a first personalized word included in the user profile data;
determining a second word representing a second personalized word included in the user profile data; and
determining second word embedding using the second word,
wherein the second audio encoding data is further determined using the second word embedding.

6. The computer-implemented method of claim 4, further comprising:
determining ASR data corresponding to the audio data, the ASR data sequentially including at least the first token and the second token, the ASR data including a representation of the first word.

7. The computer-implemented method of claim 4, further comprising:
receiving data representing a domain corresponding to the spoken input;
determining, based on the domain, a plurality of words from the user profile data;
determining token data corresponding to the plurality of words; and
determining second word embedding data using the token data, wherein the second word embedding data includes the first word embedding data.

8. The computer-implemented method of claim 4, further comprising:
  determining, using a multi-head attention component and by processing the first word embedding data and the first audio encoding data, the weight data representing the similarity between audio features in the first audio encoding data and the first word in the first word embedding data; and
  determining, using the first audio encoding data and the weight data, the second audio encoding data.

9. The computer-implemented method of claim 4, further comprising:
  receiving the audio data at a device;
  determining, using at least the audio data, a user identifier;
  determining, using the user identifier, the user profile data;
  in response to determining the user profile data, determining at least the first word included in the user profile data; and
  determining, by the device, the second token based on at least the first word.

10. The computer-implemented method of claim 4, further comprising:
  determining second language encoding data using the first word embedding data and the first language encoding data; and
  determining, using the first audio encoding data and the second language encoding data, a third token corresponding to the first portion of audio data.

11. The computer-implemented method of claim 4, further comprising:
  determining second language encoding data using the first word embedding data and the first language encoding data; and
  determining, using the second audio encoding data and the second language encoding data, a third token corresponding to the first portion of audio data.

12. The computer-implemented method of claim 4, further comprising:
  receiving audio training data corresponding to a plurality of spoken inputs;
  processing the audio training data using a first model, a second model, and a third model to determine model data; and
  determining an audio encoder, a language encoder and a multi-head attention component based on the model data and processing of the audio training data, wherein the audio encoder is configured to determine the first audio encoding data, the language encoder is configured to determine the first language encoding data and the first attention component is configured to determine the similarity.

13. A system comprising:
  at least one processor; and
  at least one memory including instructions that, when executed by the at least one processor, cause the system to:
    receive audio data corresponding to a spoken input;
    determine user profile data corresponding to the audio data;
    determine first word embedding data using at least a first word included in the user profile data;
    determine first audio encoding data corresponding to at least a first portion of the audio data;
    determine second audio encoding data using the first word embedding data, the first audio encoding data, and weight data representing a similarity between the first word embedding data and the first audio encoding data;
    determine first language encoding data corresponding to at least a first token, wherein the first token is based on a second portion of audio data occurring prior to the first portion of audio data; and
    determine, using the second audio encoding data and the first language encoding data, a second token corresponding to the first portion of audio data.

14. The system of claim 13, wherein the at least one memory includes further instructions that, when executed by the at least one processor, further cause the system to:
  determine that the first word represents a first personalized word included in the user profile data;
  determine a second word representing a second personalized word included in the user profile data; and
  determine second word embedding using the second word,
  wherein the second audio encoding data is further determined using the second word embedding.

15. The system of claim 13, wherein the at least one memory includes further instructions that, when executed by the at least one processor, further cause the system to:
  determine ASR data corresponding to the audio data, the ASR data sequentially including at least the first token and the second token, the ASR data including a representation of the first word.

16. The system of claim 13, wherein the at least one memory includes further instructions that, when executed by the at least one processor, further cause the system to:
  receive data representing a domain corresponding to the spoken input;
  determine, based on the domain, a plurality of words from the user profile data;
  determine token data corresponding to the plurality of words; and
  determine second word embedding data using the token data, wherein the second word embedding data includes the first word embedding data.

17. The system of claim 13, wherein the at least one memory includes further instructions that, when executed by the at least one processor, further cause the system to:
  determine, using a multi-head attention component and by processing the first word embedding data and the first audio encoding data, the weight data representing the similarity between audio features in the first audio encoding data and the first word in the first word embedding data; and
  determine, using the first audio encoding data and the weight data, the second audio encoding data.

18. The system of claim 13, wherein the at least one memory includes further instructions that, when executed by the at least one processor, further cause the system to:
  receive the audio data at a device;
  determine, using at least the audio data, a user identifier;
  determine, using the user identifier, the user profile data;
  in response to determining the user profile data, determine at least the first word included in the user profile data; and
  determine, by the device, the second token based on at least the first word.

19. The system of claim 13, wherein the at least one memory includes further instructions that, when executed by the at least one processor, further cause the system to:

determine second language encoding data using the first word embedding data and the first language encoding data; and determine, using the first audio encoding data and the second language encoding data, a third token corresponding to the first portion of audio data.

20. The system of claim 13, wherein the at least one memory includes further instructions that, when executed by the at least one processor, further cause the system to:

determine second language encoding data using the first word embedding data and the first language encoding data; and determine, using the second audio encoding data and the second language encoding data, a third token corresponding to the first portion of audio data.

* * * * *